US010243924B2

(12) United States Patent
Ohzaki et al.

(10) Patent No.: US 10,243,924 B2
(45) Date of Patent: Mar. 26, 2019

(54) SERVICE PROVIDING SYSTEM, SERVICE PROVIDING METHOD, AND INFORMATION PROCESSING APPARATUS

(71) Applicants: Hiroki Ohzaki, Kanagawa (JP);
Yasuharu Fukuda, Kanagawa (JP);
Seiichi Kondo, Kanagawa (JP)

(72) Inventors: Hiroki Ohzaki, Kanagawa (JP);
Yasuharu Fukuda, Kanagawa (JP);
Seiichi Kondo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 350 days.

(21) Appl. No.: 15/228,085

(22) Filed: Aug. 4, 2016

(65) Prior Publication Data

US 2017/0054684 A1    Feb. 23, 2017

(30) Foreign Application Priority Data

Aug. 18, 2015 (JP) ................................. 2015-160856
Oct. 28, 2015 (JP) ................................. 2015-212122

(51) Int. Cl.
*G06F 7/10* (2006.01)
*H04L 29/06* (2006.01)
*G07F 7/10* (2006.01)

(52) U.S. Cl.
CPC ........ *H04L 63/0245* (2013.01); *G07F 7/1025* (2013.01); *H04L 63/0807* (2013.01); *H04L 63/0884* (2013.01)

(58) Field of Classification Search
CPC ..... H04L 63/0815; H04L 63/08; H04L 63/10; H04L 63/0807; H04L 63/0884
See application file for complete search history.

(56) References Cited

U.S. PATENT DOCUMENTS

| 8,984,608 B2 | 3/2015 | Sanno et al. |
| 2010/0146275 A1* | 6/2010 | Slick ................ H04L 9/3271 713/169 |

(Continued)

FOREIGN PATENT DOCUMENTS

| JP | 2013-134655 | 7/2013 |
| JP | 2015-125510 | 7/2015 |

(Continued)

*Primary Examiner* — Tae K Kim
(74) *Attorney, Agent, or Firm* — IPUSA, PLLC

(57) ABSTRACT

A service providing system includes an application configured to provide a service to a terminal device that has made a service request including use identification information; a creator configured to create group identification information for identifying a group of the use identification information, based on a creation request from the application; an issuer configured to issue the use identification information associated with the group identification information, based on an issue request from the application, the issue request including the group identification information; and a verifier configured to verify the use identification information, based on a verification request from the application, the verification request including the group identification information and the use identification information. The application includes a verification requester configured to send the verification request to the verifier; and a process executor configured to execute a process in response to the service request, when the verification result is successful.

10 Claims, 30 Drawing Sheets

(56) References Cited

U.S. PATENT DOCUMENTS

| | | | |
|---|---|---|---|
| 2012/0229838 A1* | 9/2012 | Mogaki | G06F 21/608 358/1.14 |
| 2013/0031612 A1* | 1/2013 | Funayama | H04L 63/102 726/4 |
| 2013/0054968 A1* | 2/2013 | Gupta | H04L 63/0428 713/168 |
| 2013/0198211 A1* | 8/2013 | Kohkaki | H03M 7/00 707/756 |
| 2013/0276070 A1* | 10/2013 | Lee | G06F 21/31 726/4 |
| 2014/0020073 A1* | 1/2014 | Ronda | G06F 21/31 726/7 |
| 2014/0118780 A1* | 5/2014 | Kimura | G06F 3/1222 358/1.15 |
| 2015/0153981 A1* | 6/2015 | Iwasaki | G06F 3/1238 358/1.14 |
| 2015/0169266 A1* | 6/2015 | Iwasaki | G06F 3/1222 358/1.14 |
| 2015/0180849 A1* | 6/2015 | Nesic | H04L 63/0815 726/6 |
| 2015/0180863 A1 | 6/2015 | Kobayashi | |
| 2015/0193600 A1* | 7/2015 | Matsuda | H04L 63/0823 726/9 |
| 2015/0205551 A1* | 7/2015 | Dohi | G06F 3/1238 358/1.15 |
| 2015/0244706 A1* | 8/2015 | Grajek | H04L 63/0815 726/6 |
| 2016/0014112 A1* | 1/2016 | Gunning | H04W 12/06 713/159 |
| 2016/0285891 A1* | 9/2016 | Byers | H04L 63/0884 |
| 2017/0026362 A1* | 1/2017 | O'Donnell | H04L 63/0807 |
| 2018/0183781 A1* | 6/2018 | Miyazawa | H04L 63/08 |

FOREIGN PATENT DOCUMENTS

| | | |
|---|---|---|
| JP | 2015-130073 | 7/2015 |
| JP | 2015-132989 | 7/2015 |

* cited by examiner

FIG.7

| ITEM | EXPLANATION | EXAMPLE |
|---|---|---|
| INTERNAL ID | PRIMAL KEY IN TABLE. USED FOR INTERNAL MANAGEMENT | 00000000000000001 |
| CLIENT ID | ID FOR IDENTIFYING CLIENT | clientA |

| ITEM | EXPLANATION | EXAMPLE |
|---|---|---|
| INTERNAL ID | PRIMAL KEY IN TABLE. USED FOR INTERNAL MANAGEMENT | 00000000000000022 |
| CLIENT INTERNAL ID | INTERNAL ID FOR IDENTIFYING CLIENT | 00000000000000001 |
| TEMPORARY USE CODE SPACE ID | ID FOR IDENTIFYING TEMPORARY USE CODE SPACE | PINcode10 |
| USABLE CHARACTERS | CHARACTERS THAT CAN BE USED IN TEMPORARY USE CODE | 0123456789abcdef |
| LENGTH | LENGTH OF TEMPORARY USE CODE | 10 |
| VALIDITY PERIOD | VALIDITY PERIOD (SECONDS) OF TEMPORARY USE CODE | 604800 |
| HOLDING PERIOD | HOLDING PERIOD (SECONDS) OF TEMPORARY USE CODE AFTER EXPIRATION OF VALIDITY PERIOD | 604800 |
| ONE TIME | WHETHER TEMPORARY USE CODE CAN BE USED ONLY ONCE | false |
| UPPER LIMIT IN COLLISION PROBABILITY | UPPER LIMIT IN COLLISION PROBABILITY | 0.0001 |

| ITEM | EXPLANATION | EXAMPLE |
|---|---|---|
| INTERNAL ID | PRIMAL KEY IN TABLE. USED FOR INTERNAL MANAGEMENT | 00000000000000333 |
| TEMPORARY USE CODE SPACE INTERNAL ID | INTERNAL ID FOR IDENTIFYING TEMPORARY USE CODE SPACE | 00000000000000022 |
| TEMPORARY USE CODE | TEMPORARY USE CODE THAT HAS BEEN ISSUED | 0a1b2c3d4e |
| ISSUE TIME AND DATE | TIME AND DATE WHEN TEMPORARY USE CODE IS ISSUED | 2015/07/16 14:48 |
| VALIDITY PERIOD | VALIDITY PERIOD (SECONDS) OF TEMPORARY USE CODE | 604800 |
| HOLDING PERIOD | HOLDING PERIOD (SECONDS) OF TEMPORARY USE CODE AFTER EXPIRATION OF VALIDITY PERIOD | 604800 |
| ONE TIME | WHETHER TEMPORARY USE CODE CAN BE USED ONLY ONCE | false |
| INVALIDATION TIME AND DATE | TIME AND DATE WHEN TEMPORARY USE CODE IS INVALIDATED | NULL |
| ATTACHMENT INFORMATION | ATTACHMENT INFORMATION SPECIFIED AT TIME OF ISSUANCE | job_id = 123 |

FIG.11

- ESSENTIAL
  - CLIENT ID
  - TEMPORARY USE CODE SPACE ID
- OPTION
  - USABLE CHARACTERS
  - LENGTH
  - VALIDITY PERIOD
  - HOLDING PERIOD
  - ONE TIME
  - UPPER LIMIT IN COLLISION PROBABILITY

FIG.12

- ESSENTIAL
  - CLIENT ID
  - TEMPORARY USE CODE SPACE ID
- OPTION
  - ATTACHMENT INFORMATION

FIG.16

| ITEM | EXPLANATION | EXAMPLE |
|---|---|---|
| INTERNAL ID | PRIMAL KEY IN TABLE. USED FOR INTERNAL MANAGEMENT | 00000000000001 |
| JOB ID | ID FOR IDENTIFYING JOB | 123 |
| TENANT ID | ID FOR IDENTIFYING TENANT | 111111 |
| MAIL ADDRESS | TRANSMISSION SOURCE MAIL ADDRESS | sample@example.com |
| PRINT DATA PATH | LOCATION WHERE PRINT DATA IS STORED | /storage/xxxyyyzzz |
| TEMPORARY USE CODE | TEMPORARY USE CODE THAT HAS BEEN ISSUED | |

FIG.17

| ITEM | EXPLANATION | EXAMPLE |
|---|---|---|
| INTERNAL ID | PRIMAL KEY IN TABLE. USED FOR INTERNAL MANAGEMENT | 00000000000000001 |
| JOB ID | ID FOR IDENTIFYING JOB | 123 |
| TENANT ID | ID FOR IDENTIFYING TENANT | 111111 |
| MAIL ADDRESS | TRANSMISSION SOURCE MAIL ADDRESS | sample@example.com |
| PRINT DATA PATH | LOCATION WHERE PRINT DATA IS STORED | /storage/xxxyyyzzz |
| TEMPORARY USE CODE | TEMPORARY USE CODE THAT HAS BEEN ISSUED | 0a1b2c3d4e |

FIG.20

| ITEM | EXPLANATION | EXAMPLE |
|---|---|---|
| INTERNAL ID | PRIMAL KEY IN TABLE. USED FOR INTERNAL MANAGEMENT | 00000000000000001 |
| JOB ID | ID FOR IDENTIFYING JOB | 123 |
| TENANT ID | ID FOR IDENTIFYING TENANT | 111111 |
| MAIL ADDRESS | TRANSMISSION SOURCE MAIL ADDRESS | sample@example.com |
| PRINT DATA PATH | LOCATION WHERE PRINT DATA IS STORED | /storage/xxxyyyzzz |

FIG.21

| ITEM | EXPLANATION | VALUE STORED IN TEMPORARY USE CODE SPACE FOR PIN CODE ASSOCIATED WITH AUTHORITY |
|---|---|---|
| INTERNAL ID | PRIMAL KEY IN TABLE. USED FOR INTERNAL MANAGEMENT | 1 |
| CLIENT INTERNAL ID | INTERNAL ID FOR IDENTIFYING CLIENT | NULL |
| TEMPORARY USE CODE SPACE ID | ID FOR IDENTIFYING TEMPORARY USE CODE SPACE | common |
| USABLE CHARACTERS | CHARACTERS THAT CAN BE USED IN TEMPORARY USE CODE | ABCDEFGHIJKLMNOPQRSTUVWXYZ abcdefghijklmnopqrstuvwxyz0123456789 |
| LENGTH | LENGTH OF TEMPORARY USE CODE | 64 |
| VALIDITY PERIOD | VALIDITY PERIOD (SECONDS) OF TEMPORARY USE CODE | 604800 |
| HOLDING PERIOD | HOLDING PERIOD (SECONDS) OF TEMPORARY USE CODE AFTER EXPIRATION OF VALIDITY PERIOD | 604800 |
| ONE TIME | WHETHER TEMPORARY USE CODE CAN BE USED ONLY ONCE | true |
| UPPER LIMIT IN COLLISION PROBABILITY | UPPER LIMIT IN COLLISION PROBABILITY | 0.0001 |

FIG.22

| ITEM | EXPLANATION | EXAMPLE |
|---|---|---|
| INTERNAL ID | PRIMAL KEY IN TABLE. USED FOR INTERNAL MANAGEMENT | 2 |
| TEMPORARY USE CODE SPACE INTERNAL ID | INTERNAL ID FOR IDENTIFYING TEMPORARY USE CODE SPACE | 1 |
| TEMPORARY USE CODE | TEMPORARY USE CODE THAT HAS BEEN ISSUED | 0a1b2c3d4e |
| ISSUE TIME AND DATE | TIME AND DATE WHEN TEMPORARY USE CODE IS ISSUED | 2015/07/16 14:48 |
| VALIDITY PERIOD | VALIDITY PERIOD (SECONDS) OF TEMPORARY USE CODE | 604800 |
| HOLDING PERIOD | HOLDING PERIOD (SECONDS) OF TEMPORARY USE CODE AFTER EXPIRATION OF VALIDITY PERIOD | 604800 |
| ONE TIME | WHETHER TEMPORARY USE CODE CAN BE USED ONLY ONCE | false |
| INVALIDATION TIME AND DATE | TIME AND DATE WHEN TEMPORARY USE CODE IS INVALIDATED | NULL |
| ATTACHMENT INFORMATION | ATTACHMENT INFORMATION SPECIFIED AT TIME OF ISSUANCE | |
| AUTHORITY INTERNAL ID | INTERNAL ID FOR IDENTIFYING AUTHORITY | 3 |

FIG.23

| ITEM | EXPLANATION | EXAMPLE |
|---|---|---|
| INTERNAL ID | PRIMAL KEY IN TABLE. USED FOR INTERNAL MANAGEMENT | 3 |
| AUTHORITY ID | ID FOR IDENTIFYING AUTHORITY | permission0001 |
| NAME | NAME OF AUTHORITY | |
| EXPLANATION | EXPLANATION OF AUTHORITY | |

FIG.24

| ITEM | EXPLANATION | EXAMPLE |
|---|---|---|
| INTERNAL ID | PRIMAL KEY IN TABLE. USED FOR INTERNAL MANAGEMENT | 4 |
| AUTHORITY INTERNAL ID | INTERNAL ID FOR IDENTIFYING AUTHORITY | 3 |
| NAME OF SUBJECT TABLE | NAME OF TABLE STORING ENTITY OF SUBJECT OF AUTHORITY | user |
| INTERNAL ID OF SUBJECT | INTERNAL ID OF ENTITY OF SUBJECT OF AUTHORITY | 00000000000000001 |

FIG.25

| ITEM | EXPLANATION | EXAMPLE |
|---|---|---|
| INTERNAL ID | PRIMAL KEY IN TABLE. USED FOR INTERNAL MANAGEMENT | 5 |
| AUTHORITY INTERNAL ID | INTERNAL ID FOR IDENTIFYING AUTHORITY | 3 |
| NAME OF AUTHORITY RESOURCE TABLE | NAME OF TABLE STORING ENTITY OF AUTHORITY RESOURCE | api_resource |
| INTERNAL ID OF AUTHORITY RESOURCE | INTERNAL ID OF ENTITY OF AUTHORITY RESOURCE | 9 |

FIG.26

| ITEM | EXPLANATION | EXAMPLE |
|---|---|---|
| INTERNAL ID | PRIMAL KEY IN TABLE. USED FOR INTERNAL MANAGEMENT | 6 |
| AUTHORITY INTERNAL ID | INTERNAL ID FOR IDENTIFYING AUTHORITY | 3 |
| INTERNAL ID OF ENTITY OF OPERATION | INTERNAL ID OF ENTITY OF OPERATION OF AUTHORITY | 7 |

FIG.27

| ITEM | EXPLANATION | EXAMPLE |
|---|---|---|
| INTERNAL ID | PRIMAL KEY IN TABLE. USED FOR INTERNAL MANAGEMENT | 7 |
| TYPE | TYPE OF OPERATION | http_method |
| NAME | NAME OF OPERATION | post |

FIG.28

| ITEM | EXPLANATION | EXAMPLE |
|---|---|---|
| INTERNAL ID | PRIMAL KEY IN TABLE. USED FOR INTERNAL MANAGEMENT | 8 |
| AUTHORITY INTERNAL ID | INTERNAL ID FOR IDENTIFYING AUTHORITY | 3 |
| CONDITION | CONDITION BY WHICH AUTHORITY BECOMES VALID | [{"key": "body.role", "value": ["User"]}] |

FIG.29

| ITEM | EXPLANATION | EXAMPLE |
|---|---|---|
| INTERNAL ID | PRIMAL KEY IN TABLE. USED FOR INTERNAL MANAGEMENT | 9 |
| AUTHORITY RESOURCE INTERNAL ID | INTERNAL ID FOR IDENTIFYING AUTHORITY RESOURCE | 5 |
| PATH | PATH OF API | /organizations/aaa/users |

FIG.31

ADD USER

MAIL ADDRESS: [                    ]

[SEND]

FIG.32

NOTIFICATION OF USER REGISTRATION

PLEASE PERFORM USER REGISTRATION
FROM FOLLOWING HYPERLINK DESTINATION.
http://example.com/register?code=099EBPi2xmQGFDGE5Y
mgQFFgDTtqxLfRIUINc1VTv7B9OrMxajq3YcIH9j5pXxMl

FIG. 33A

```
POST /temporary_code/issue HTTP/1.1
Content-Type: application/json; charset=utf-8
Host: api.example.com
Cookie: iPlanetDirectoryPro="AQIC5wM2LY4SfcymWBhLM9otpmi8CzEZNEsLXv1X9bEcaB0.*AAJTSQACMDE.*"

{
 "resource": [{"type": "url", "params" : [{"path": "/organizations/aaa/users"}]},
 "action": [{"type": "http_method", "params": [{"name": POST}]}],
 "condition": [{"key": "body.role", "value": ["User"]}],
 "expires_in": 3600,
 "onetime": true
}
```

FIG. 33B

```
HTTP/1.1 200 OK
Content-Type: application/json; charset=utf-8

{
 "code": "099EBPi2xmQGFDGE5YmgQFFgDTtqxLfRIUINc1VTv7B9OrMxajq3YcIH9j5pXxMI",
 "expires_in": 3600,
 "onetime": true,
 "resource": [{"type": "url", "params": [{"path": "/organizations/aaa/users"}]},
 "action": [{"type": "http_method", "params": [{"name": POST}]}],
 "condition": [{"key": "body.role", "value": ["User"]}]
}
```

FIG.34

```
POST /organizations/aaa/users HTTP/1.1
Content-Type: application/json; charset=utf-8
Host: api.example.com
X-Temporary-Authorization-Code: 099EBPi2xmQGFDGE5YmgQFFgDTtqxLfRlUINc1VTv7B9OrMxajq3YciH9j5pXxMl {
  "user_id": "user0001",
  "password": "password",
  "role": ["User"]
}
```

SERVICE PROVIDING SYSTEM, SERVICE PROVIDING METHOD, AND INFORMATION PROCESSING APPARATUS

CROSS-REFERENCE TO RELATED APPLICATION

The present application claims the benefit of priority under 35 U.S.C. § 119 of Japanese Patent Application No. 2015-160856, filed on Aug. 18, 2015 and Japanese Patent Application No. 2015-212122, filed on Oct. 28, 2015, the contents of which are incorporated herein by reference in their entirety.

BACKGROUND OF THE INVENTION

1. Field of the Invention

The present invention relates to a service providing system, a service providing method, and an information processing apparatus.

2. Description of the Related Art

In recent years, an increasing number of companies have been installing cloud services. A cloud service is a service provided by the cloud computing technology. An example of a cloud service is a printing service using a Personal Identification Number (PIN) code.

For example, in a printing system of the related art using a PIN code, an e-mail is received from a user terminal. To the e-mail, electronic data (print data) that is the printing target is attached. The print data is stored in association with a PIN code, and then the PIN code is returned to the user by e-mail. The user inputs the PIN code in the image forming apparatus to be used for executing the printing operation. In the printing system of the related art, the electronic data, which is the printing target stored in association with the PIN code, is acquired to print the print data that is the printing target requested to be printed by the user (see, for example, Patent Document 1).

Patent Document 1: Japanese Unexamined Patent Application Publication No. 2015-132989

SUMMARY OF THE INVENTION

An aspect of the present invention provides a service providing system, a service providing method, and an information processing apparatus, in which one or more of the above-described disadvantages are reduced.

According to one aspect of the present invention, there is provided a service providing system including at least one information processing apparatus for implementing various functions of the service providing system, the service providing system including an application configured to provide a service to at least one terminal device that has made a service request including a specification of use identification information; a group identification information creator configured to create group identification information for identifying a group of the use identification information, based on a creation request from the application; a use identification information issuer configured to issue the use identification information associated with the group identification information, based on an issue request to issue the use identification information from the application, the issue request including a specification of the group identification information; and a use identification information verifier configured to verify the use identification information, based on a verification request to verify the use identification information from the application, the verification request including specifications of the group identification information and the use identification information, wherein the application includes a use identification information verification requester configured to send the verification request to verify the use identification information specified in the service request, to the use identification information verifier; and a process executor configured to execute a process in response to the service request, when a verification result of the use identification information obtained by the use identification information verifier is successful.

BRIEF DESCRIPTION OF THE DRAWINGS

Other objects, features and advantages of the present invention will become more apparent from the following detailed description when read in conjunction with the accompanying drawings, in which:

FIG. 7 is a diagram illustrating an example of a configuration of client information managed by a client managing unit according to the first embodiment of the present invention;

FIG. 8 is a configuration diagram illustrating an example of temporary use code space information stored in a temporary use code space information storage unit according to the first embodiment of the present invention;

FIG. 9 is a configuration diagram illustrating an example of temporary use code information stored in a temporary use code information storage unit according to the first embodiment of the present invention;

FIG. 11 is a configuration diagram illustrating an example of an API for creating a temporary use code space according to the first embodiment of the present invention;

FIG. 12 is a configuration diagram illustrating an example of an API for issuing a temporary use code according to the first embodiment of the present invention;

FIG. 16 is a configuration diagram illustrating an example of job information stored in a job information storage unit, according to the second embodiment of the present invention;

FIG. 17 is a configuration diagram illustrating an example of job information in which the temporary use code is registered, according to the second embodiment of the present invention;

FIG. 20 is a configuration diagram illustrating another example of job information stored in the job information storage unit according to the third embodiment of the present invention;

FIG. 21 is a configuration diagram illustrating another example of temporary use code space information stored in the temporary use code space information storage unit according to a fourth embodiment of the present invention;

FIG. 22 is a configuration diagram illustrating an example of a temporary use code information management table stored in the temporary use code information storage unit according to the fourth embodiment of the present invention;

FIG. 23 is a configuration diagram illustrating an example of an authority information management table storing authority information according to the fourth embodiment of the present invention;

FIG. 24 is a configuration diagram illustrating an example of an authority subject information management table storing authority subject information according to the fourth embodiment of the present invention;

FIG. 25 is a configuration diagram illustrating an example of an authority resource information management table storing authority resource information according to the fourth embodiment of the present invention;

FIG. 26 is a configuration diagram illustrating an example of an authority operation information management table storing authority operation information according to the fourth embodiment of the present invention;

FIG. 27 is a configuration diagram illustrating an example of an authority operation entity information management table storing authority operation entity information according to the fourth embodiment of the present invention;

FIG. 28 is a configuration diagram illustrating an example of an authority condition information management table storing authority condition information according to the fourth embodiment of the present invention;

FIG. 29 is a configuration diagram illustrating an example of an authority API resource information management table storing authority API resource information according to the fourth embodiment of the present invention;

FIG. 31 is an image diagram illustrating an example of a screen for generating a URL for user registration according to the fourth embodiment of the present invention;

FIG. 32 is an image diagram illustrating an example of text in a mail for reporting a URL for user registration to a general user according to the fourth embodiment of the present invention;

FIGS. 33A and 33B are diagrams illustrating examples of the request of the API executed in step S102 and the response to the request according to the fourth embodiment of the present invention;

FIG. 34 is a diagram illustrating an example of a request of the API executed in step S107 according to the fourth embodiment of the present invention.

DETAILED DESCRIPTION OF THE PREFERRED EMBODIMENTS

In the service providing system of the related art, a temporary use code such as a PIN code, is used as use identification information. In such a service providing system, it is necessary to set the attributes of the temporary use code, such as the length (the number of digits) and the validity period, in order to prevent the same (matching) temporary use codes from being issued by coincidence. Therefore, in the service providing system of the related art using temporary temporary use codes, as the number of provided services increases and the number of users increases, there may be cases where each temporary use code becomes long and the validity period of the temporary use code becomes short. However, a long temporary use code having many digits and a temporary use code having a short validity period are inconvenient from the viewpoint of usability of the user.

A problem to be solved by an embodiment of the present invention is to provide a service providing system by which easily usable use identification information can be used.

Embodiments of the present invention will be described by referring to the accompanying drawings.

First Embodiment

<System Configuration>

Figure 1:
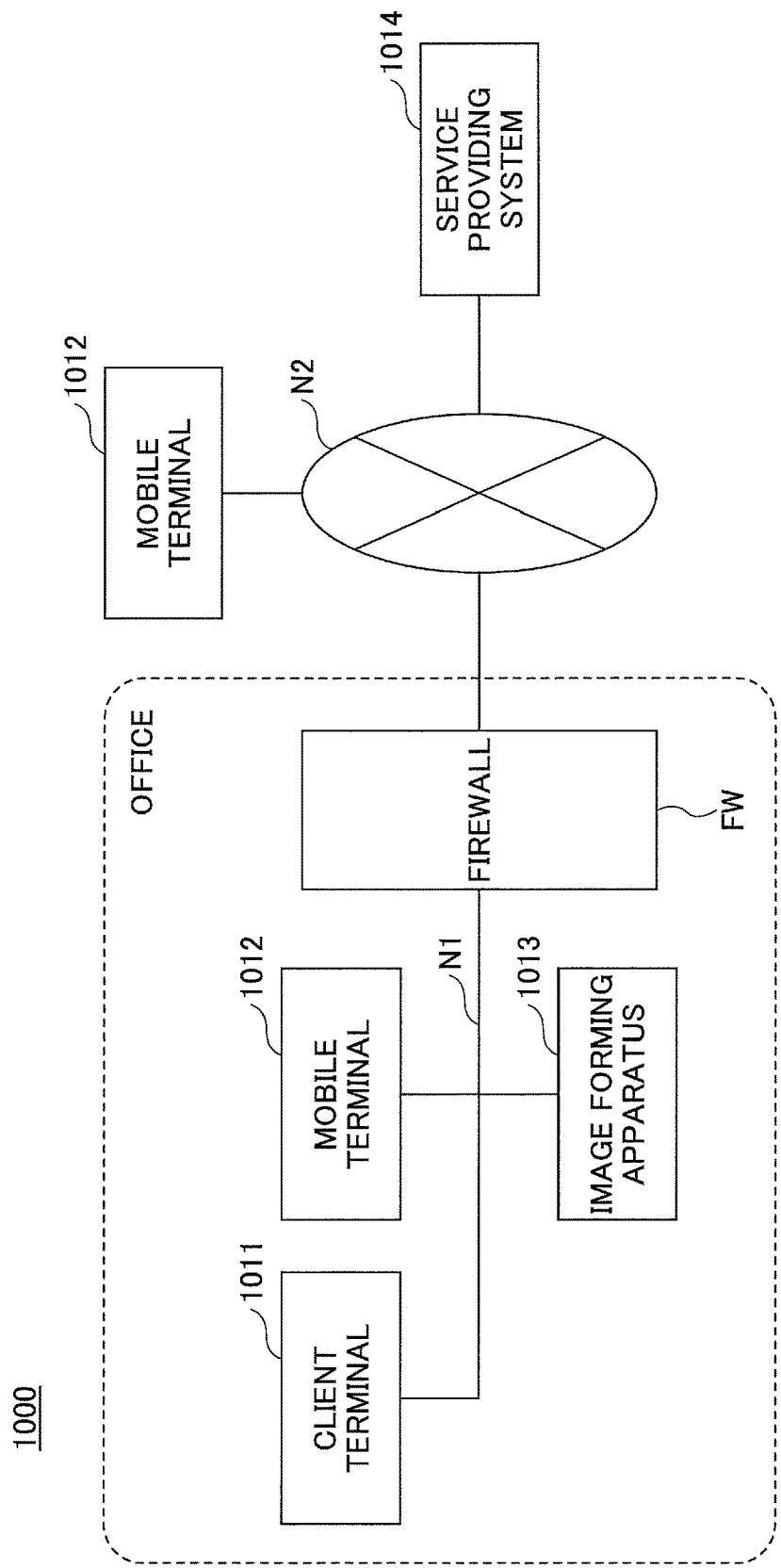
FIG. 1 is a configuration diagram illustrating an example of an information processing system according to a first embodiment of the present invention.

FIG. 1 is a configuration diagram illustrating an example of an information processing system according to a first embodiment of the present invention. An information processing system 1000 of FIG. 1 includes a network N1 such as an internal network in the office and a network N2 such as the Internet.

The network N1 is a private network on the inside of a firewall FW. The firewall FW is provided at the contact point of the network N1 and the network N2. The firewall FW is for detecting and blocking unauthorized accesses. To the network N1, a client terminal 1011, a mobile terminal 1012, and an image forming apparatus 1013 such as a multifunction peripheral are connected.

The client terminal 1011 is an example of a terminal device. The client terminal 1011 is realized by an information processing apparatus in which a general operating system (OS) is installed. The client terminal 1011 includes a wired or wireless communication means. The client terminal 1011 is a terminal that is operable by the user, such as a desktop personal computer (PC) or a notebook PC, etc.

The mobile terminal 1012 is an example of a terminal device. The mobile terminal 1012 includes a wired or wireless communication means. The mobile terminal 1012 is a terminal that can be carried and operated by the user, such as a smartphone, a mobile phone, and a tablet PC, etc.

The image forming apparatus 1013 is a device having an image forming function such as a multifunction peripheral. The image forming apparatus 1013 is also an example of a terminal device. The image forming apparatus 1013 includes a wired or wireless communication means.

The image forming apparatus 1013 is a device for performing processes relevant to image formation, such as a multifunction peripheral, a copier, a scanner, a printer, a laser printer, a projector, and an electronic blackboard, etc. The example of FIG. 1 includes one of each of the client terminal 1011, the mobile terminal 1012, and the image forming apparatus 1013; however, there may be a plurality of each of these devices.

Furthermore, to the network N2, the mobile terminal 1012 and a service providing system 1014 are connected. The mobile terminal 1012 may be outside the network N1 that is an internal network inside an office. FIG. 1 illustrates an example in which the mobile terminal 1012 is connected to the network N1 and the network N2.

The service providing system 1014 is realized by one or more information processing apparatuses. The service providing system 1014 is an example of a system for providing some kind of service to the client terminal 1011, the mobile terminal 1012, and the image forming apparatus 1013. Note that details of the service providing system 1014 are described below.

<Hardware Configuration>

Figure 2:
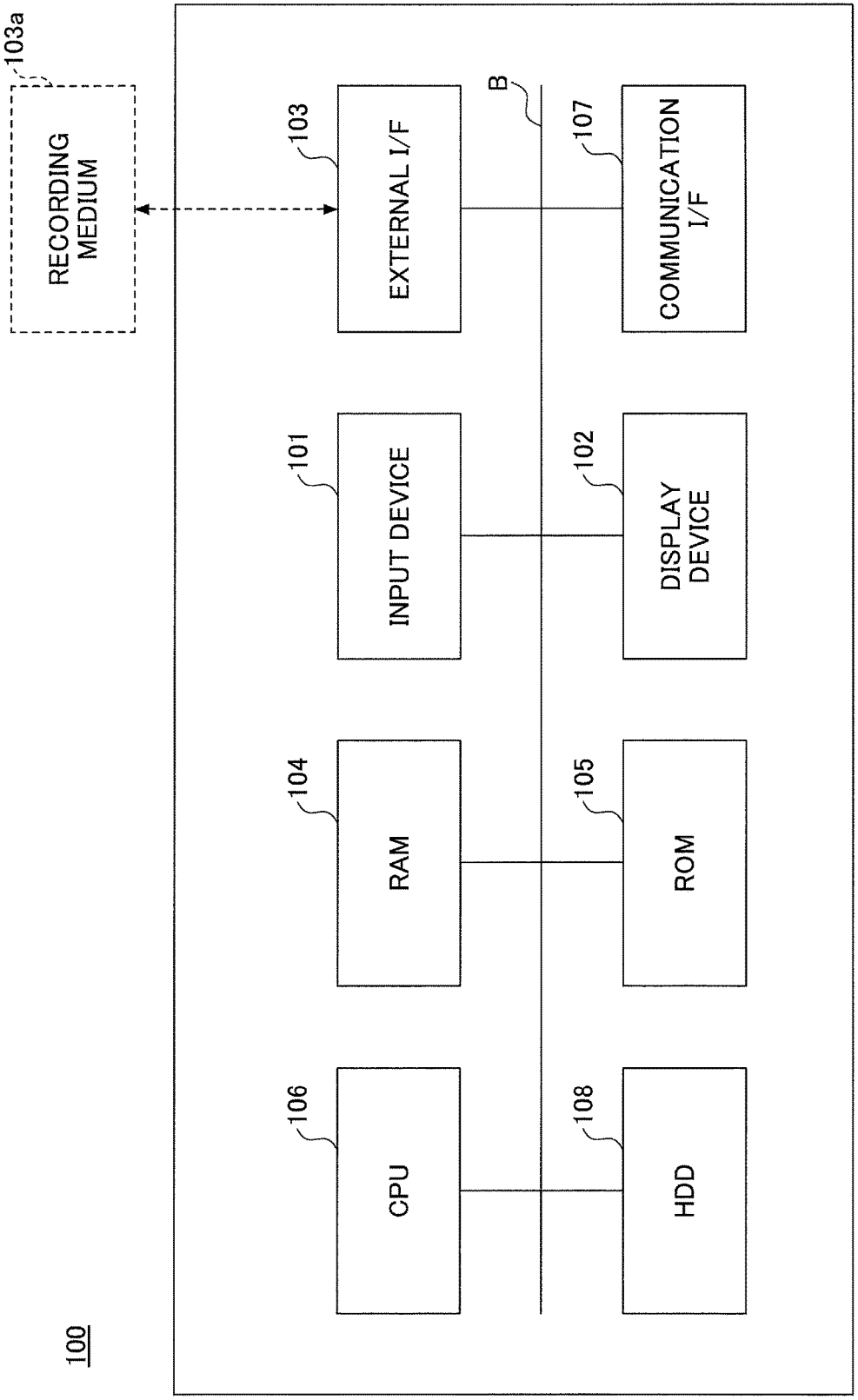
FIG. 2 is a block diagram illustrating an example of a hardware configuration of an example of a computer according to the first embodiment of the present invention.

The client terminal 1011 and the mobile terminal 1012 illustrated in FIG. 1 are realized by a computer having a hardware configuration, for example, as illustrated in FIG. 2. Furthermore, the one or more information processing apparatuses realizing the service providing system 1014 are realized by a computer having a hardware configuration as illustrated in FIG. 2.

FIG. 2 is a block diagram illustrating an example of a hardware configuration of an example of a computer according to the first embodiment of the present invention. A computer 100 illustrated in FIG. 2 includes an input device 101, a display device 102, an external interface (I/F) 103, a Random Access Memory (RAM) 104, a Read-Only Memory (ROM) 105, a Central Processing Unit (CPU) 106, a communication I/F 107, and a Hard Disk Drive (HDD) 108, which are interconnected by a bus B.

The input device 101 includes a keyboard, a mouse, and a touch panel, and is used by the user for inputting various operation signals. The display device 102 includes a display, etc., and displays processing results obtained by the computer 100. Note that the input device 101 and the display device 102 may have a configuration of being connected and used when necessary.

The communication I/F 107 is an interface that connects the computer 100 to the networks N1 and N2. Accordingly, the computer 100 is able to perform data communication via the communication I/F 107.

The HDD 108 is a non-volatile storage device for storing programs and data. Examples of the stored programs and data include an OS that is the basic software for controlling the entire computer 100, and application software for providing various functions in the OS. Note that the computer 100 may use a drive device (for example, a solid state drive (SSD)) using a flash memory as the storage medium, instead of the HDD 108.

The external I/F 103 is an interface between the computer 100 and an external device. An example of the external device is a recording medium 103a. Accordingly, the computer 100 is able to read and/or write in the recording medium 103a via the external I/F 103. Examples of the recording medium 103a are a flexible disk, a Compact Disc (CD), a Digital Versatile Disc (DVD), a Secure Digital (SD) memory card, and a Universal Serial Bus (USB) memory.

The ROM 105 is a non-volatile semiconductor memory (storage device) that can store programs and data even after the power is turned off. The ROM 105 stores programs and data such as a Basic Input/Output System (BIOS) that is executed when the computer 100 is activated, OS settings, and network settings, etc. The RAM 104 is a volatile semiconductor memory (storage device) for temporarily storing programs and data.

The CPU 106 is an arithmetic device for controlling the entire computer 100 and realizing functions of the computer 100, by loading the programs and data from the storage devices such as the ROM 105 and the HDD 108, into the RAM 104, and executing processes.

The client terminal 1011 and the mobile terminal 1012 of FIG. 1 are able to realize various processes described below, by the hardware configuration of the computer 100. Furthermore, the one or more information processing apparatuses realizing the service providing system 1014 are able to realize various processes described below, by the hardware configuration of the computer 100.

Figure 3:
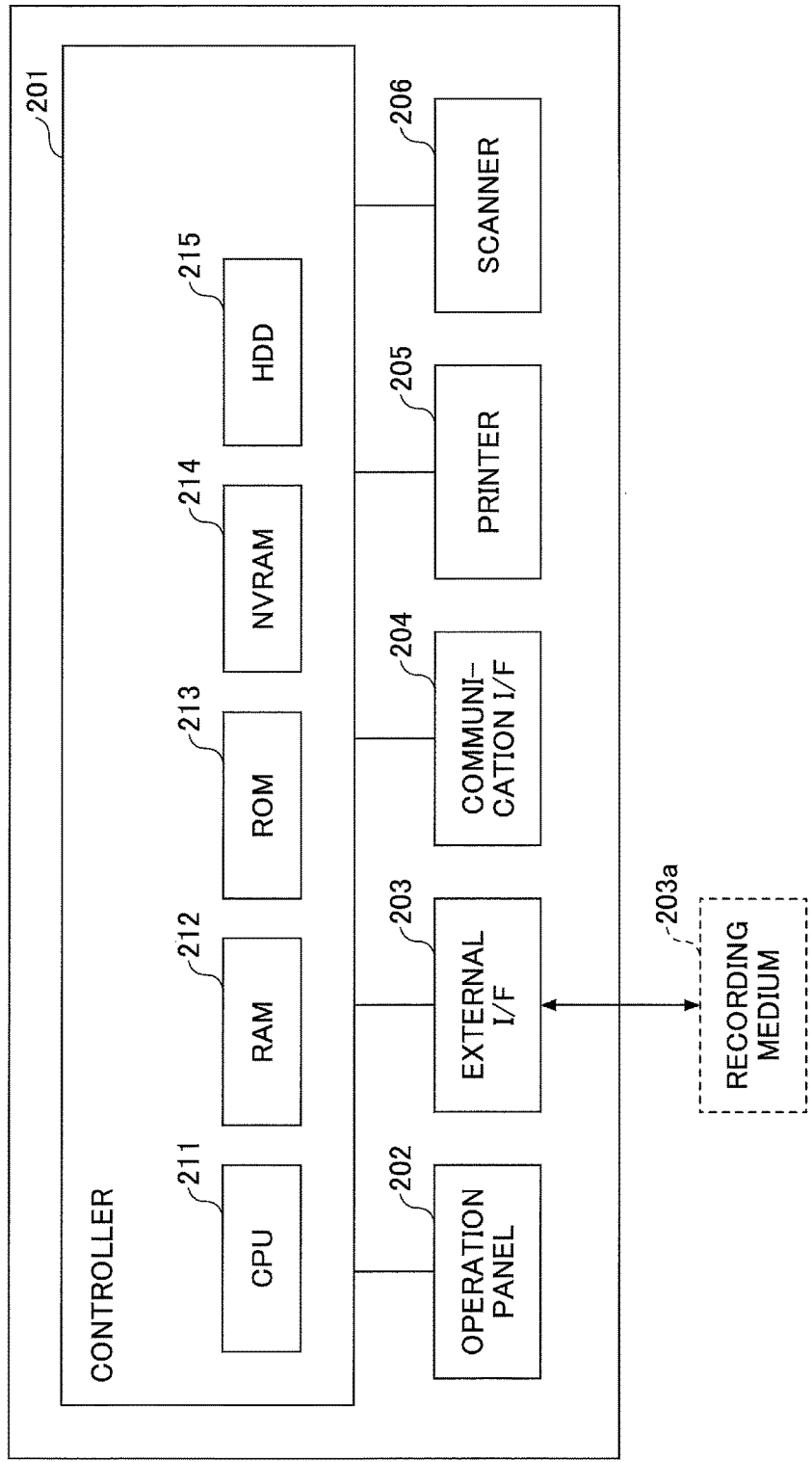
FIG. 3 is a block diagram illustrating an example of a hardware configuration of an image forming apparatus according to the first embodiment of the present invention.

FIG. 3 is a block diagram illustrating an example of a hardware configuration of the image forming apparatus 1013 according to the first embodiment of the present invention. The image forming apparatus 1013 illustrated in FIG. 3 includes a controller 201, an operation panel 202, an external I/F 203, a communication I/F 204, a printer 205, and a scanner 206.

The controller 201 includes a CPU 211, a RAM 212, a ROM 213, a NVRAM 214, and a HDD 215. The ROM 213 stores various programs and data. The RAM 212 temporarily stores programs and data. The NVRAM 214 stores, for example, setting information. Furthermore, the HDD 215 stores various programs and data.

The CPU 211 controls the entire image forming apparatus 1013 and realizes functions of the image forming apparatus 1013, by loading the programs, the data, and setting information from the ROM 213, the NVRAM 214, and the HDD 215, into the RAM 212, and executing processes.

The operation panel 202 includes an input unit for accepting input from a user, and a display unit for displaying information. The external I/F 203 is an interface between the image forming apparatus 1013 and an external device. An example of the external device is a recording medium 203a. Accordingly, the image forming apparatus 1013 is able to read and/or write in the recording medium 203a via the external I/F 203. Examples of the recording medium 203a are an integrated circuit (IC) card, a flexible disk, a CD, a DVD, an SD memory card, and a USB memory.

Furthermore, the communication I/F 204 is an interface that connects the image forming apparatus 1013 to the network N1. Accordingly, the image forming apparatus 1013 is able to perform data communication via the communication I/F 204. The printer 205 is a printing device for printing print data onto a conveyed object. Examples of a conveyed object are paper, a coat sheet, cardboard, an Over Head Projector (OHP) film, a plastic film, prepreg, and copper foil, etc., and the conveyed object is not limited to paper. Furthermore, the scanner 206 is a reading device for reading image data from an original document. The image forming apparatus 1013 according to the present embodiment is able to realize various processes described below, by the hardware configuration described above. Note that a description of the hardware configuration of the firewall FW is omitted.

<Software Configuration>

<<Service Providing System>>

Figure 4:
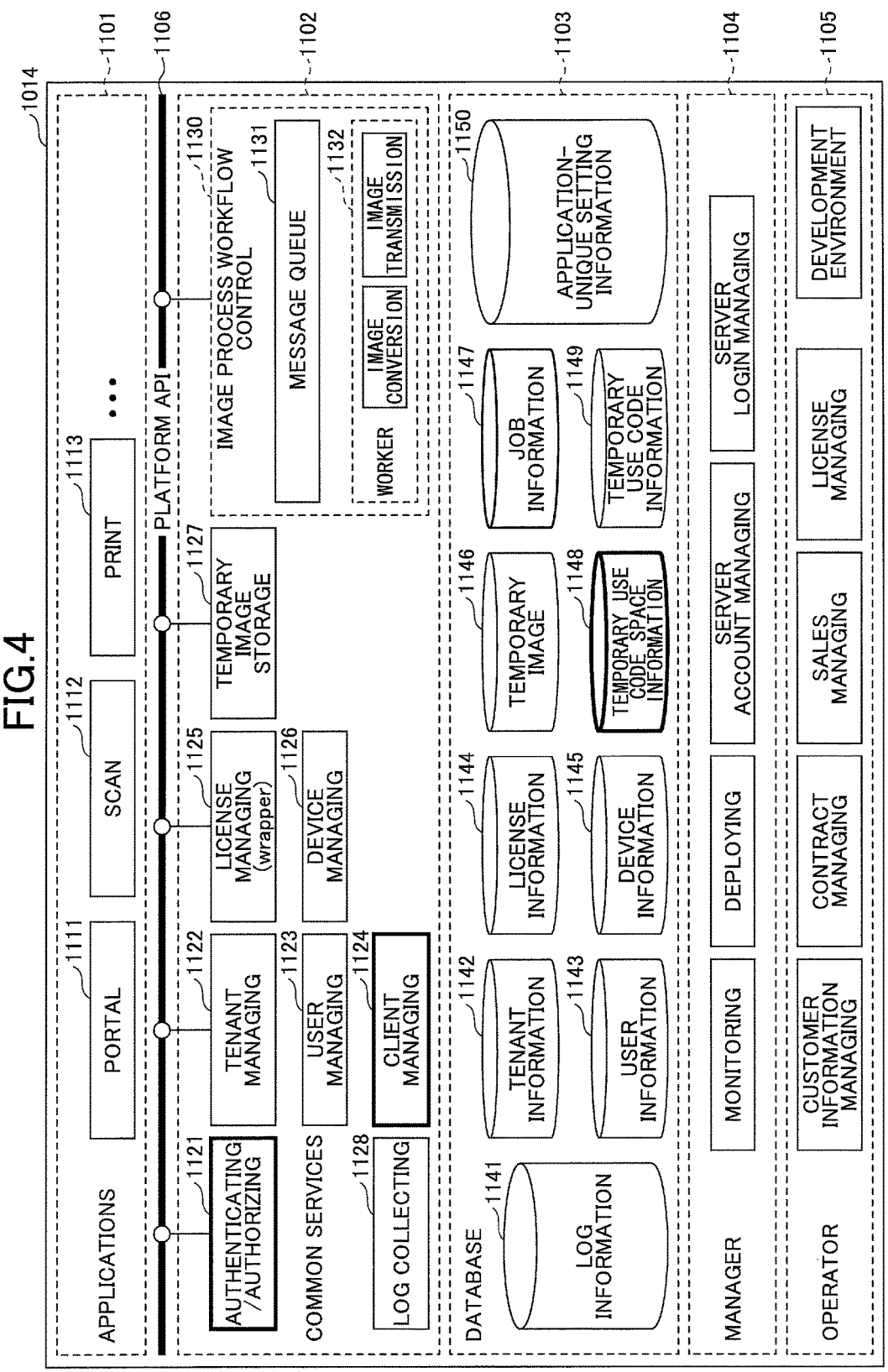
FIG. 4 is a process block diagram illustrating an example of a service providing system according to the first embodiment of the present invention.

The service providing system 1014 according to the first embodiment is realized by, for example, process blocks illustrated in FIG. 4. FIG. 4 is a process block diagram illustrating an example of the service providing system 1014 according to the first embodiment of the present invention. The service providing system 1014 executes programs to realize the process blocks as illustrated in FIG. 4.

The service providing system 1014 illustrated in FIG. 4 includes applications 1101, common services 1102, a database (DB) 1103, a manager 1104, an operator 1105, and a platform Application Programming Interface (API) 1106.

The applications 1101 include, for example, a portal service application 1111, a scan service application 1112, and a print service application 1113.

The portal service application 1111 is an application for providing a portal service. A portal service provides a service of an entrance for using the service providing system 1014. The scan service application 1112 is an application for providing a scan service. The print service application 1113 is an application for providing a print service. The applications 1101 may include other service applications.

The platform API 1106 is an interface for using the common services 1102 by the portal service application 1111, the scan service application 1112, and the print service application 1113. The platform API 1106 is an interface that is defined in advance. The platform API 1106 is provided for the common services 1102 to receive requests from the applications 1101. For example, the platform API 1106 is formed of functions and classes, etc.

When the service providing system 1014 is formed of a plurality of information processing apparatuses, the platform API 1106 may be realized by, for example, a Web API that can be used via the network.

The common services 1102 include an authenticating/authorizing unit 1121, a tenant managing unit 1122, a user managing unit 1123, client managing unit 1124, a license managing unit 1125, a device managing unit 1126, a temporary image storage unit 1127, a log collecting unit 1128, and an image process workflow control unit 1130.

Furthermore, the image process workflow control unit 1130 includes a message queue 1131 and one or more workers 1132. The worker 1132 realizes functions such as image conversion and image transmission.

The authenticating/authorizing unit 1121 executes authentication/authorization based on a login request from an office device such as the client terminal 1011 and the image forming apparatus 1013. The office device is a term for collectively referring to the client terminal 1011, the mobile terminal 1012, and the image forming apparatus 1013.

The authenticating/authorizing unit 1121 accesses, for example, a user information storage unit 1143 and a license information storage unit 1144 described below, and authenticates/authorizes a user. Furthermore, for example, the authenticating/authorizing unit 1121 accesses a tenant information storage unit 1142, the license information storage unit 1144, and a device information storage unit 1145 described below, and authenticates the image forming apparatus 1013.

Furthermore, the authenticating/authorizing unit 1121 accesses a temporary use code space information storage unit 1148 and a temporary use code information storage unit 1149 described below, and creates a temporary use code space and issues a temporary use code.

The tenant managing unit 1122 manages tenant information stored in the tenant information storage unit 1142 described below. Note that a tenant is a unit of a group such as a company or a department. The user managing unit 1123 manages user information stored in the user information storage unit 1143 described below. The client managing unit 1124 manages client information described below.

The license managing unit 1125 manages license information stored in the license information storage unit 1144 described below. The device managing unit 1126 manages device information stored in the device information storage unit 1145 described below. The temporary image storage unit 1127 stores a temporary image in a temporary image storage unit 1146 described below, and acquires a temporary image from the temporary image storage unit 1146. The log collecting unit 1128 manages log information stored in a log information storage unit 1141 described below.

The image process workflow control unit 1130 controls a workflow relevant to image processing, based on a request from the applications 1101. The message queue 1131 includes queues corresponding to the types of processes. The image process workflow control unit 1130 inputs a message of a request relevant to a process (job), in the queue corresponding to the type of the job.

The worker 1132 monitors the corresponding queue. When a message is input to a queue, the worker 1132 performs a process such as image conversion or image transmission according to the type of the corresponding job. Note that the message input to a queue may be proactively read by the worker 1132 (pull), or the message may be provided from the queue to the worker 1132 (push).

The database 1103 illustrated in FIG. 4 includes the log information storage unit 1141, the tenant information storage unit 1142, the user information storage unit 1143, the license information storage unit 1144, the device information storage unit 1145, the temporary image storage unit 1146, a job information storage unit 1147, the temporary use code space information storage unit 1148, the temporary use code information storage unit 1149, and an application-unique setting information storage unit 1150.

The log information storage unit 1141 stores log information. The tenant information storage unit 1142 stores tenant information. The user information storage unit 1143 stores user information. The license information storage unit 1144 stores license information. Furthermore, the device information storage unit 1145 stores device information.

The temporary image storage unit 1146 stores a temporary image. A temporary image is, for example, a file or data such as a scan image to be processed by the worker 1132. The job information storage unit 1147 stores information (job information) of a request relevant to a process (job). The temporary use code space information storage unit 1148 stores temporary use code space information described below. The temporary use code information storage unit 1149 stores temporary use code information described below. Furthermore, the application-unique setting information storage unit 1150 stores setting information unique to the application 1101.

The manager 1104 illustrated in FIG. 4 includes, for example, a monitoring unit, a deploying unit, a server account managing unit, and a server login managing unit. Furthermore, the operator 1105 illustrated in FIG. 4 includes, for example, a customer information managing unit, a contract managing unit, a sales managing unit, a license managing unit, and a development environment unit.

The manager 1104 functions as an integration basis for providing common services such as workflows relevant to authentication/authorization and image processing, and a group of services for proving application services such as a scan service and a print service by using the function of the integration basis.

The integration basis includes, for example, the common services 1102, the database 1103, the manager 1104, the operator 1105, and the platform API 1106. The group of services includes, for example, the applications 1101.

The service providing system 1014 illustrated in FIG. 4 has a configuration in which the group of services and the integration basis are separated. Therefore, the applications 1101 using the platform API 1106 can be easily developed.

Note that the classification form of the process blocks of the service providing system 1014 illustrated in FIG. 4 is one example. The applications 1101, the common services 1102, the database 1103, the manager 1104, and the operator 1105 need not be classified into the hierarchies as illustrated in FIG. 4. As long as processes by the service providing system 1014 according to the first embodiment can be performed, the hierarchical relationship, etc., illustrated in FIG. 4 is not limited to a particular relationship.

The applications included in the applications 1101 of the service providing system 1014, such as the portal service application 1111, the scan service application 1112, and the print service application 1113, etc., can use the temporary use code space and the temporary use code described below.

Figure 5:
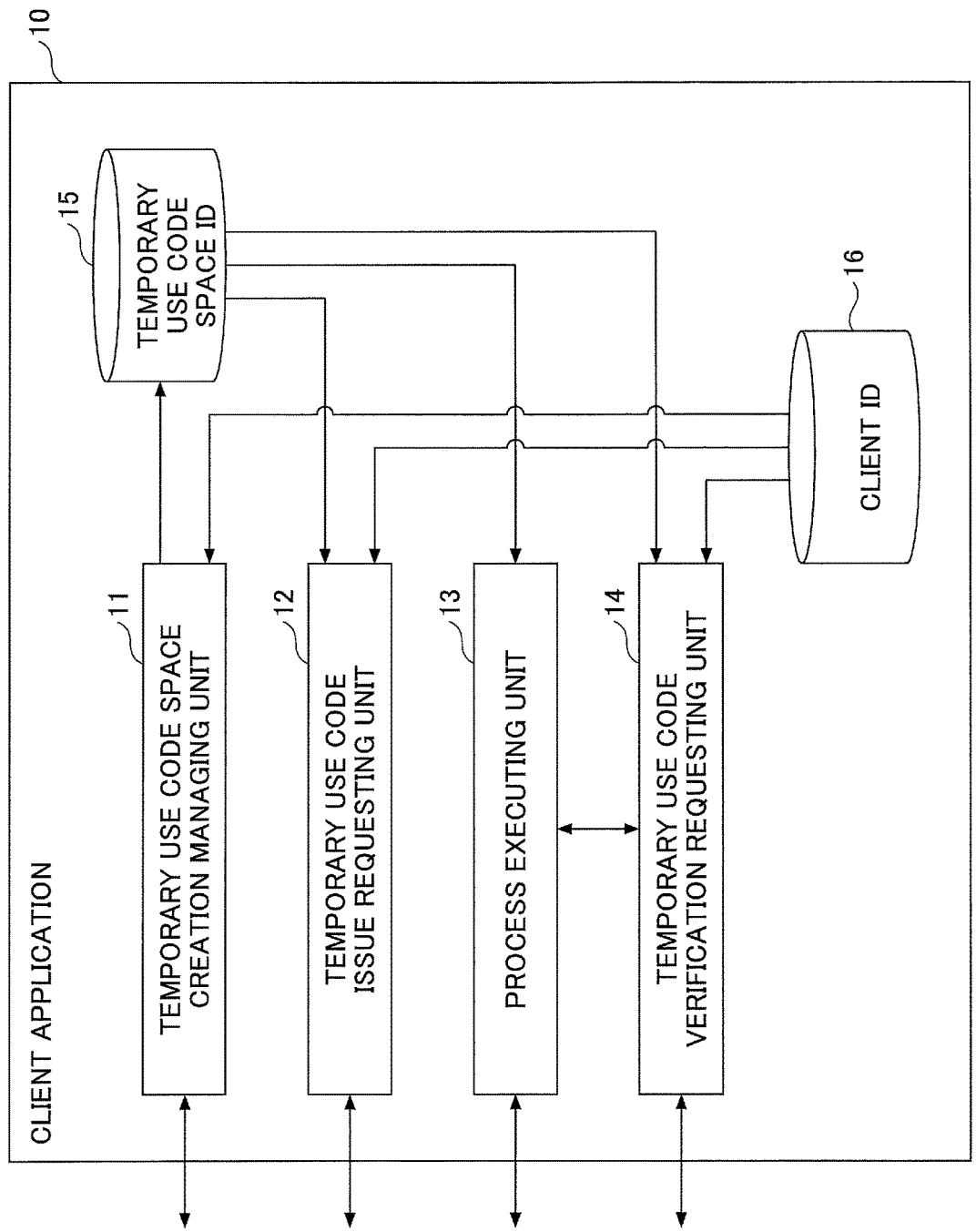
FIG. 5 is a process block diagram illustrating an example of a client application according to the first embodiment of the present invention.

In the following, among the applications included in the applications 1101, an application using the temporary use code space and the temporary use code described below, is referred to as a client application 10. FIG. 5 is a process block diagram illustrating an example of the client application 10 according to the first embodiment of the present invention.

The client applications 10 illustrated in FIG. 5 includes a temporary use code space creation managing unit 11, a temporary use code issue requesting unit 12, a process executing unit 13, a temporary use code verification requesting unit 14, a temporary use code space ID storage unit 15, and a client ID storage unit 16.

The client ID storage unit 16 stores a client ID that is an ID for identifying the client application 10. The temporary use code space creation managing unit 11 specifies a client ID and a temporary use code space ID in a request, requests the authenticating/authorizing unit 1121 to create a temporary use code space relevant to the specified information, and reserves a temporary use code space information resource. The temporary use code space ID of the created temporary use code space is stored in the temporary use code space ID storage unit 15.

The temporary use code issue requesting unit 12 specifies a client ID and a temporary use code space ID in a request, requests the authenticating/authorizing unit 1121 to issue a temporary use code relevant to the specified information, and acquires the issued temporary use code.

When a request for some kind of action, in which the temporary use code is specified, is received, for example, from the image forming apparatus 1013 operated by the user, the process executing unit 13 requests the temporary use code verification requesting unit 14 to verify the specified temporary use code. The process executing unit 13 obtains the result of verification from the temporary use code verification requesting unit 14. When the obtained result of verification is successful, the process executing unit 13 performs a process corresponding to the request for some kind of action.

The temporary use code verification requesting unit 14 specifies a client ID, a temporary use code space ID, and a temporary use code in a request, requests the authenticating/authorizing unit 1121 to verify the temporary use code relevant to the specified information, and obtains the result of verification. The temporary use code verification requesting unit 14 returns the result of verification to the process executing unit 13.

Figure 6:
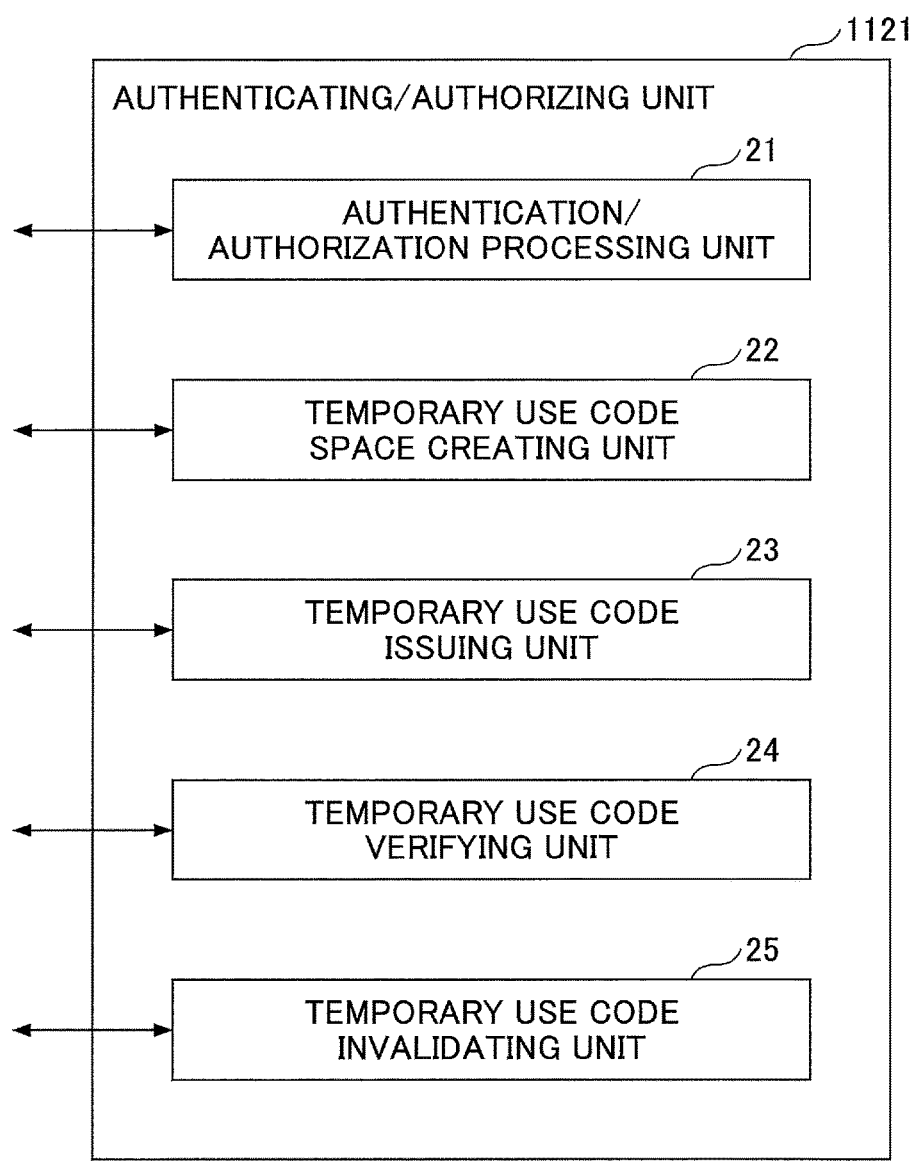
FIG. 6 is a process block diagram illustrating an example of an authenticating/authorizing unit according to the first embodiment of the present invention.

FIG. 6 is a process block diagram illustrating an example of the authenticating/authorizing unit 1121 according to the first embodiment of the present invention. The authenticating/authorizing unit 1121 includes an authentication/authorization processing unit 21, a temporary use code space creating unit 22, a temporary use code issuing unit 23, a temporary use code verifying unit 24, and a temporary use code invalidating unit 25.

The authentication/authorization processing unit 21 performs processes relevant to authentication/authorization. The temporary use code space creating unit 22 accepts a request to create a temporary use code space from the client application 10. The request includes specifications of a client ID and a temporary use code space ID. The temporary use code space creating unit 22 creates a temporary use code space in response to the request. Furthermore, the temporary use code space creating unit 22 stores temporary use code space information in the temporary use code space information storage unit 1148.

The temporary use code issuing unit 23 accepts a request to issue a temporary use code from the client application 10. The request includes specifications of a client ID and a temporary use code space ID. The temporary use code issuing unit 23 issues a temporary use code in response to the request. Furthermore, the temporary use code issuing unit 23 stores the temporary use code in the temporary use code information storage unit 1149. The temporary use code issuing unit 23 returns the issued temporary use code to the client application 10.

The temporary use code verifying unit 24 accepts a request to verify the temporary use code from the client application 10. The request includes specifications of a client ID, a temporary use code space ID, and a temporary use code. The temporary use code verifying unit 24 verifies the temporary use code in response to the request. Then, the temporary use code verifying unit 24 returns the result of verifying the temporary use code to the client application 10.

The temporary use code invalidating unit 25 accepts attributes of the temporary use code described below, and a request to invalidate the temporary use code from the client application 10. The request includes specifications of a temporary use code space ID and a temporary use code. The temporary use code invalidating unit 25 performs a process of invalidating the temporary use code.

FIG. 7 is a diagram illustrating an example of a configuration of client information managed by the client managing unit 1124 according to the first embodiment of the present invention. The client information illustrated in FIG. 7 includes the items of an internal ID and a client ID. The internal ID is a primal key in the database 1103, and is used for internal management. The client ID is an ID for identifying the client application 10.

Furthermore, FIG. 8 is a configuration diagram illustrating an example of temporary use code space information stored in the temporary use code space information storage unit 1148 according to the first embodiment of the present invention. The temporary use code space information illustrated in FIG. 8 includes the items of an internal ID, a client internal ID, a temporary use code space ID, usable characters, the length, a validity period, a holding period, "one time", and the upper limit in the collision probability.

The internal ID is the primal key in the database 1103, and is used for internal management. The client internal ID is an internal ID of the client application 10. The temporary use code space ID is an ID for identifying the temporary use code space.

Furthermore, the usable characters, the length, a validity period, a holding period, "one time", and the upper limit in the collision probability that are items of the temporary use code space information of FIG. 8, are items for specifying the attributes of the temporary use code. The usable characters are characters that can be used in the temporary use code. The length expresses the length (number of digits) of the temporary use code. The validity period expresses the validity period of the temporary use code. The holding period expresses the holding period after the validity period of the temporary use code has expired. "One time" expresses whether the temporary use code can be used only once. The upper limit in the collision probability expresses the upper limit in the probability of the same (matching) temporary use codes being issued by coincidence.

Here, the collision probability is further described. For example, the collision probability is expressed by the following calculating formula.

$$(\text{number of held temporary use codes})/(\text{number of usable characters}^\wedge \text{length})$$

In other words, the collision probability is the ratio of temporary use code that have already been issued, among all of the patterns of temporary use codes. Furthermore, in other words, the collision probability is the probability that temporary use codes match by coincidence when random characters are input.

For example, in a case where the usable characters are "0123456789" and the length is "5", all of the patterns of temporary use codes are expressed as "00000" through "99999", which are 10^5=100000 patterns. When the upper limit in the collision probability is "0.0001", 0.0001=10/100000 is satisfied. When ten temporary use codes are issued, the number reaches the upper limit in the collision probability, and the eleventh temporary use code will not be issued.

Furthermore, in a case where the usable characters are "0 through 9, a through z, and A through Z", and the length is "4", all of the patterns of temporary use codes are expressed as "0000" through "ZZZZ", which are 62^4=14778336 patterns. When the upper limit in the collision probability is "0.0001", 0.0001=1477.8336/14778336 is satisfied, and 1477 temporary use codes can be issued. The 1478th temporary use code, which exceeds the upper limit in the collision probability, will not be issued.

As described above, as the upper limit in the collision probability is increased, the number of temporary use codes that can be issued will increase; however, the probability that the temporary use codes match by coincidence will also increase.

Furthermore, FIG. 9 is a configuration diagram illustrating an example of temporary use code information stored in the temporary use code information storage unit 1149 according to the first embodiment of the present invention. The temporary use code information includes the items of an internal ID, a temporary use code space internal ID, a temporary use code, the issue time and date, a validity period, a holding period, "one time", the invalidation time and date, and attachment information.

The internal ID is the primal key in the database 1103, and is used for internal management. The temporary use code space internal ID is an internal ID for identifying the temporary use code space. The temporary use code expresses the temporary use code that has been issued. The issue time and date expresses the time and date when the temporary use code has been issued. The validity period expresses the validity period of the temporary use code. The holding period expresses the holding period after the validity period of the temporary use code has expired. "One time" expresses whether the temporary use code can be used only once. The invalidation time and date expresses the time and date when the temporary use code has been invalidated. The attachment information expresses the attachment information that is specified at the time when the temporary use code is issued.

<Details of Process>

Figure 10:
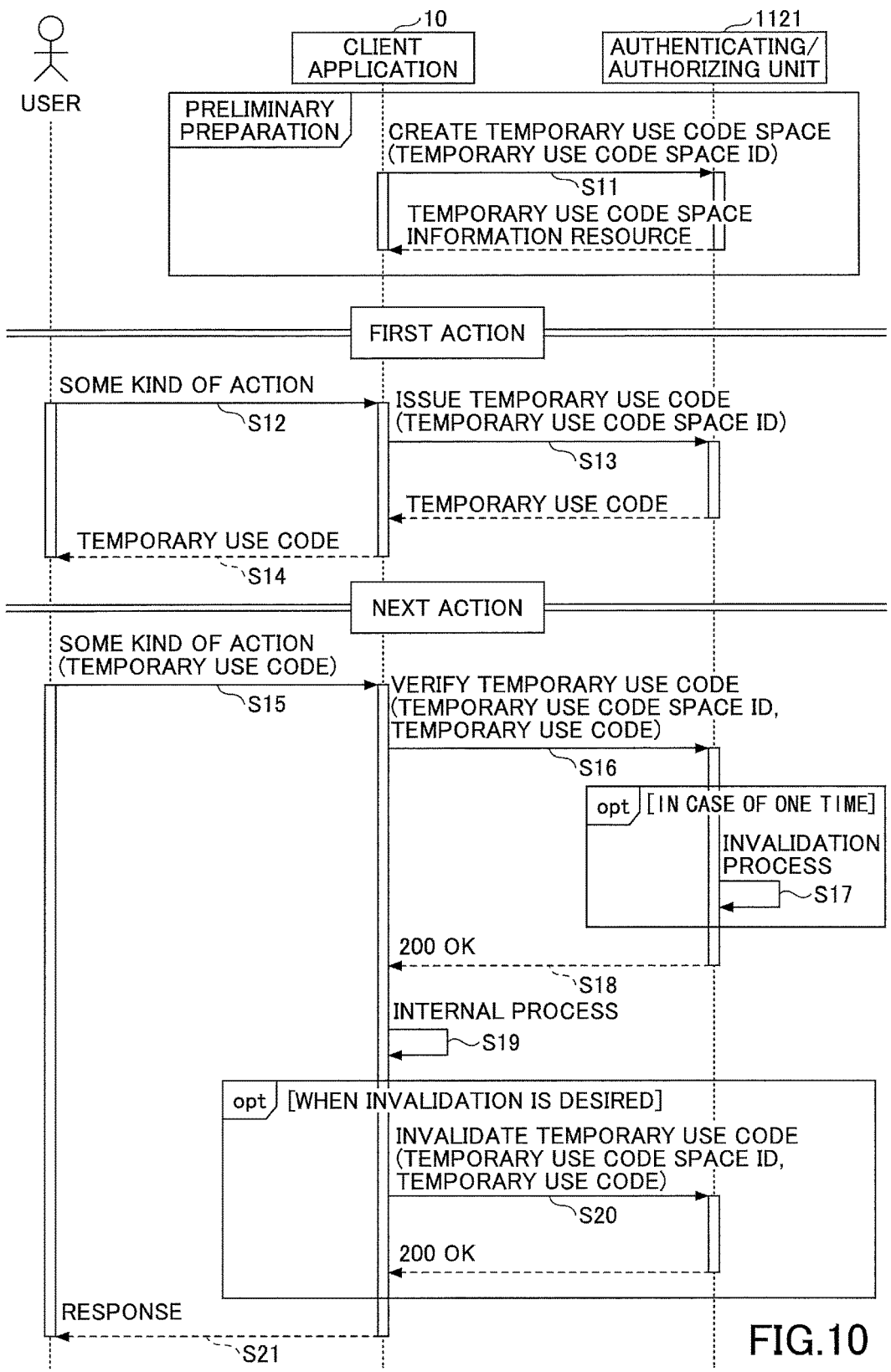
FIG. 10 is a sequence diagram illustrating an example of a process by a service providing system according to the first embodiment of the present invention.

In the following, a description is given of details of the process by the service providing system 1014 according to the first embodiment. FIG. 10 is a sequence diagram illustrating an example of a process by the service providing system 1014 according to the first embodiment of the present invention.

The service providing system 1014 according to the first embodiment creates a temporary use code space, as preliminary preparation. As the timing of creating a temporary use code space, several timings may be considered depending on how the client application 10 uses the temporary use code space. When the temporary use code space is divided in units of tenants, the temporary use code space is created when a tenant administrator makes a service usage registration or when the service is used at the tenant for the first time.

When the temporary use code space is divided in units of functions, the temporary use code space is created at a timing when the client application 10 is activated for the first time or at a timing when the function is used for the first time. The temporary use code space may be created in units of combinations of functions and tenants. Furthermore, when the tenant administrator makes a service usage registration, the client application 10 that has been subjected to service usage registration may send a request to create a temporary use code space to the authenticating/authorizing unit 1121.

In step S11, the temporary use code space creation managing unit 11 of the client application 10 specifies a client ID and a temporary use code space ID in a request, and requests the authenticating/authorizing unit 1121 to create a temporary use code space relevant to the specified information. For example, the temporary use code space creation managing unit 11 uses the API for creating a temporary use code space illustrated in FIG. 11 included in the platform API 1106, to make the request to create a temporary use code space.

FIG. 11 is a configuration diagram illustrating an example of an API for creating a temporary use code space according to the first embodiment of the present invention. The API for creating a temporary use code of FIG. 11 specifies a client ID and a temporary use code space ID as essential parameters. Furthermore, the API for creating a temporary use code of FIG. 11 can specify usable characters, the length, a validity period, a holding period, "one time", and the upper limit in the collision probability, as option parameters. The option parameters are not essential; if the option parameters are not specified, default values are set.

The temporary use code space creating unit 22 of the authenticating/authorizing unit 1121 that has received the request to create a temporary use code space, accepts a request to create a temporary use code space using the API for creating a temporary use code space of FIG. 11, and creates a temporary use code space. The temporary use code space creating unit 22 stores temporary use code space information of the temporary use code space as illustrated in FIG. 8, in the temporary use code space information storage unit 1148. The temporary use code space creating unit 22 sends a response indicating that the temporary use code space information resource is reserved, to the temporary use code space creation managing unit 11 of the client application 10.

In step S12, as a first action, for example, the user operates the client terminal 1011, and requests the client application 10 to perform some kind of action. When the temporary use code issue requesting unit 12 of the client application 10 accepts a request for some kind of action in which a temporary use code is not specified, the temporary use code issue requesting unit 12 sends a request to issue a temporary use code. For example, the temporary use code issue requesting unit 12 uses the API for issuing a temporary use code illustrated in FIG. 12 included in the platform API 1106, to send a request to issue a temporary use code.

FIG. 12 is a configuration diagram illustrating an example of an API for issuing a temporary use code according to the first embodiment of the present invention. The API for issuing a temporary use code illustrated in FIG. 12 specifies a client ID and a temporary use code space ID as essential parameters. Furthermore, the API for issuing a temporary use code illustrated in FIG. 12 can specify attachment information as an option parameter. The option parameter is not essential and does not have to be specified.

The temporary use code issuing unit 23 of the authenticating/authorizing unit 1121, which has received the request to issue a temporary use code, accepts the request to issue a temporary use code using the API for issuing a temporary use code illustrated in FIG. 12, and issues a temporary use code (step S13). The temporary use code issuing unit 23 issues a temporary use code according to the items specifying the attributes of the temporary use code included among the items of the temporary use code space information illustrated in FIG. 8. The temporary use code issuing unit 23 stores the temporary use code information of the temporary use code as illustrated in FIG. 9, in the temporary use code information storage unit 1149. The temporary use code issuing unit 23 returns the temporary use code that has been issued, to the temporary use code issue requesting unit 12 of the client application 10.

In step S14, for example, the temporary use code issue requesting unit 12 returns the temporary use code to the client terminal 1011, and displays the temporary use code on the display device 102 of the client terminal 1011. Therefore, the user can confirm the temporary use code issued by the service providing system 1014.

As the next action, in step S15, for example, the user operates the image forming apparatus 1013 to input the temporary use code, and requests the client application 10 for some kind of action. When the process executing unit 13 of the client application 10 accepts a request for some kind of action including a specification of the temporary use code, the process executing unit 13 requests the temporary use code verification requesting unit 14 to verify the specified temporary use code.

In step S16, the temporary use code verification requesting unit 14 specifies a client ID, a temporary use code space ID, and a temporary use code in a request, and requests the temporary use code verifying unit 24 of the authenticating/authorizing unit 1121 to verify the temporary use code relevant to the specified information. The temporary use code verifying unit 24 accepts the request to verify the temporary use code, including the specifications of the client ID, the temporary use code space ID, and the temporary use code, from the client application 10. Then, the temporary use code verifying unit 24 performs verification by referring to, for example, the temporary use code space information of FIG. 8 and the temporary use code information of FIG. 9.

When the referred information includes a combination of the client ID, the temporary use code space ID, and the temporary use code specified in the request to verify the temporary use code, the temporary use code verifying unit 24 determines that the result of verification is successful. When the referred information does not include a combination of the client ID, the temporary use code space ID, and the temporary use code specified in the request to verify the temporary use code, the temporary use code verifying unit 24 determines that the result of verification is unsuccessful.

When the verification result is successful and the temporary use code is "one time", in step S17, the temporary use code invalidating unit 25 performs a process of invalidating the temporary use code. The process of invalidating the temporary use code is a process of registering the invalidation time and date in the temporary use code information in FIG. 9. In step S18, the temporary use code verifying unit 24 returns the verification result of the temporary use code, to the client application 10.

The process executing unit 13 obtains the verification result from the temporary use code verification requesting unit 14. When the obtained verification result is successful, in step S19, the process executing unit 13 performs a process (internal process) according to the request for some kind of action. Note that when invalidation of the temporary use code after the internal process is desired, in step S20, the process executing unit 13 makes an invalidation request. Specifically, the process executing unit 13 specifies the client ID, the temporary use code space ID, and the temporary use code in a request, and requests the temporary use code invalidating unit 25 of the authenticating/authorizing unit 1121 to invalidate the temporary use code relevant to the specified information. The temporary use code invalidating unit 25 performs the process of invalidating the temporary use code, and returns a response. Then, in step S21, the process executing unit 13 of the client application 10 returns a response to the request for some kind of action of step S15, for example, to the image forming apparatus 1013.

As described above, the service providing system 1014 according to the first embodiment can use the client information of FIG. 7, the temporary use code space information of FIG. 8, and the temporary use code information of FIG. 9 to create a temporary use code space for each of the client applications 10.

Figure 13:
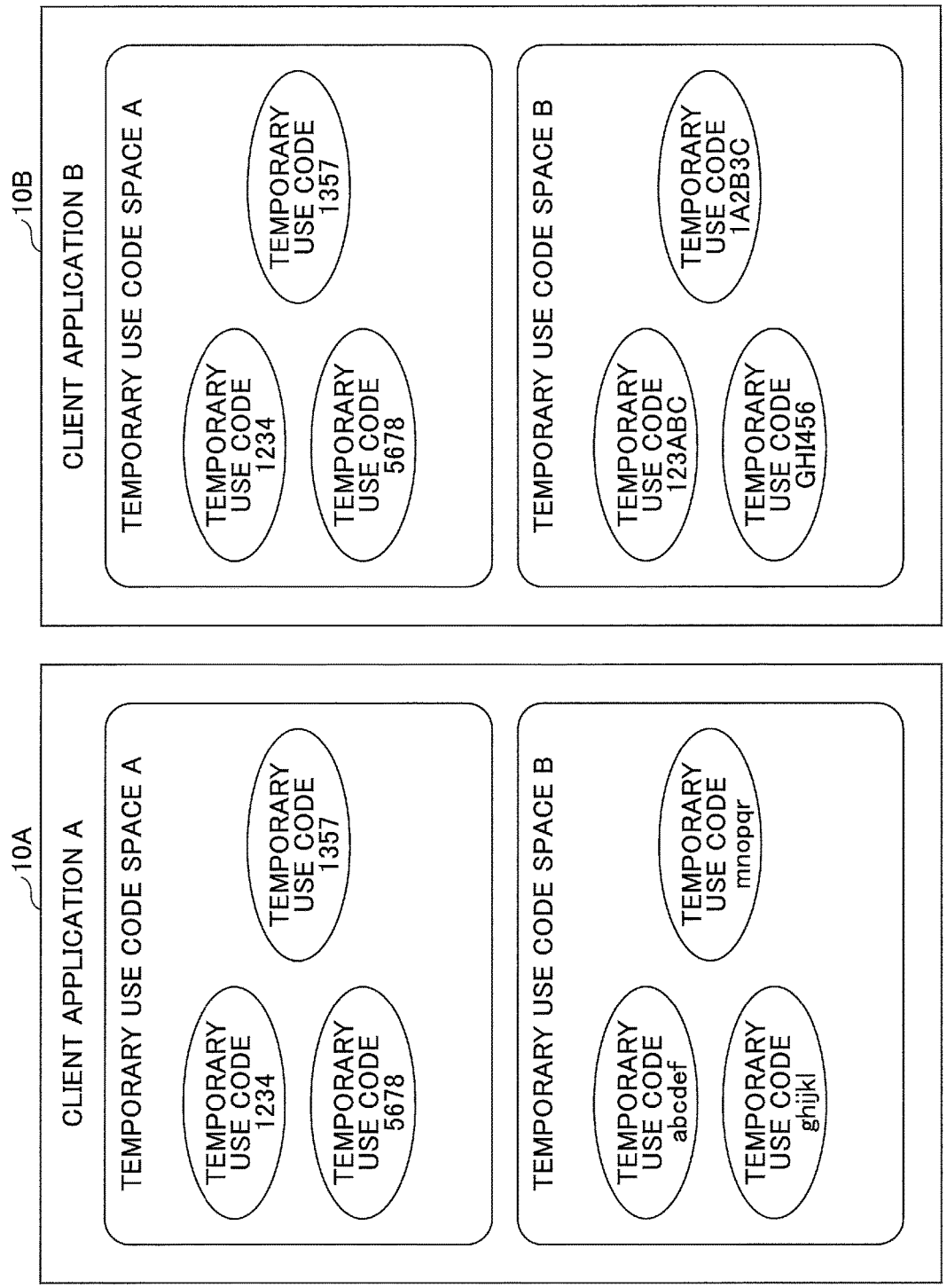
FIG. 13 is a diagram for explaining the temporary use code space created for each client application according to the first embodiment of the present invention.

FIG. 13 is a diagram for explaining the temporary use code space created for each client application 10 according to the first embodiment of the present invention. FIG. 13 illustrates temporary use code spaces A and B created in each of the client applications 10A and 10B, and temporary use codes issued in each of the temporary use code spaces A and B.

As illustrated in FIG. 13, the service providing system 1014 according to the first embodiment can issue a temporary use code for each client application 10. In FIG. 13, the same temporary use codes "1234", "5678", and "1357" are issued in the temporary use code space A of both the client applications 10A and 10B. However, the service providing system 1014 according to the first embodiment is capable of treating the same temporary use codes as different temporary use codes, if the temporary use codes belong to different client applications 10.

Furthermore, as illustrated in FIG. 13, the service providing system 1014 according to the first embodiment can issue a temporary use code for each temporary use code space. The service providing system 1014 according to the first embodiment is capable of treating the same temporary use codes as different temporary use codes, if the temporary use codes belong to different temporary use code spaces.

Furthermore, the service providing system 1014 according to the first embodiment can define attributes (usable characters and length, etc.) of a temporary use code to be issued, for each temporary use code space, for example, as illustrated in FIG. 8. The service providing system 1014 according to the first embodiment issues a temporary use code, based on the attributes of the temporary use code defined for each temporary use code space. Therefore, temporary use codes, which have been issued from the same temporary use code space, have the same attributes. In the service providing system 1014 according to the first embodiment, an upper limit in the collision probability is set in the attributes of the temporary use code, and therefore the attributes cannot be changed for each temporary use code.

Furthermore, as described above, the service providing system 1014 according to the first embodiment can use the API for creating a temporary use code space of FIG. 11 to specify the attributes of the temporary use code from the client application 10. Note that in the API for creating a temporary use code space of FIG. 11, a holding period is set as one of the attributes of the temporary use code.

Figure 14A:
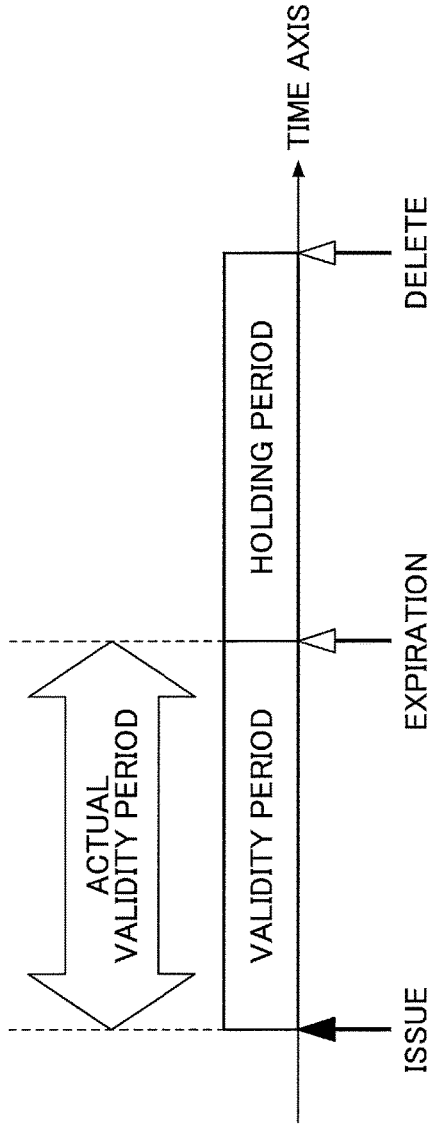
FIGS. 14A and 14B are diagrams for explaining the holding period in the attributes of a temporary use code according to the first embodiment of the present invention.
Figure 14B:
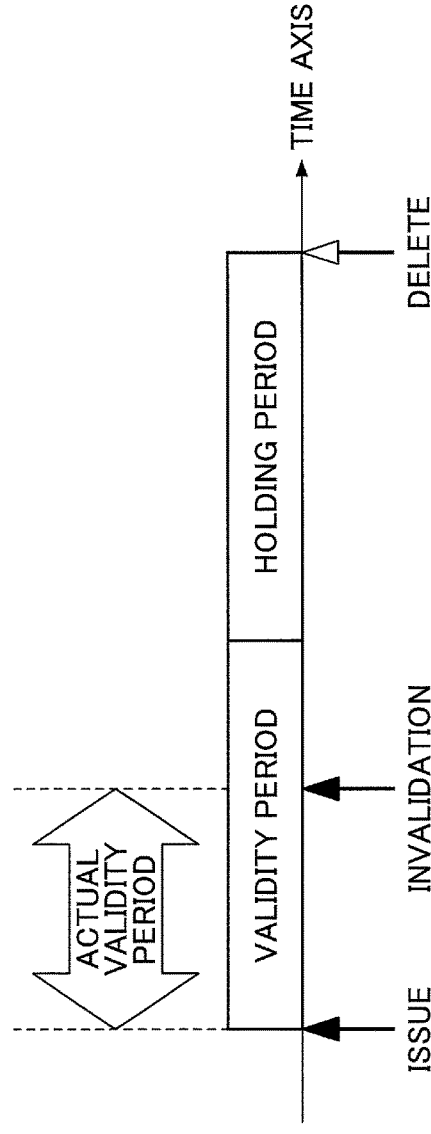

The holding period is a period provided for preventing the same temporary use code from being issued after the validity period has expired, for example, as illustrated in FIGS. 14A and 14B. FIGS. 14A and 14B are diagrams for explaining the holding period in the attributes of a temporary use code according to the first embodiment of the present invention.

As illustrated in FIGS. 14A and 14B, the holding period is set after the validity period expressing the actual validity period of the temporary use code. As illustrated in FIG. 14A, after the temporary use code is issued, the temporary use code is deleted after the validity period+the holding period pass. Furthermore, as illustrated in FIG. 14B, also in the case where the temporary use code is invalidated before the validity period passes, the temporary use code is deleted after the validity period+the holding period pass.

Overview

First Embodiment

The service providing system 1014 according to the first embodiment is capable of issuing a temporary use code for each temporary use code space, and therefore even when there is an increase in the services or an increase in the users using the service, the length of the temporary use code can be prevented from increasing excessively. Furthermore, the service providing system 1014 according to the first embodiment is capable of issuing a temporary use code for each temporary use code space, and therefore even when there is an increase in the services or an increase in the users using the service, the validity period of the temporary use code can be prevented from decreasing excessively.

Therefore, the service providing system 1014 according to the first embodiment is capable of realizing easily usable temporary use codes that are easily usable for the user and that have less digits and longer validity periods than temporary use codes of the related art.

Second Embodiment

In the first embodiment, a description is given of an example in which the user requests the client application 10 to perform some kind of action. In a second embodiment, a description is given of an example in which the user requests the print service application 1113, which is an example of the client application 10, to execute printing. Note that the second embodiment is the same as the first embodiment except for some parts, and therefore descriptions are omitted according to need.

Figure 15:
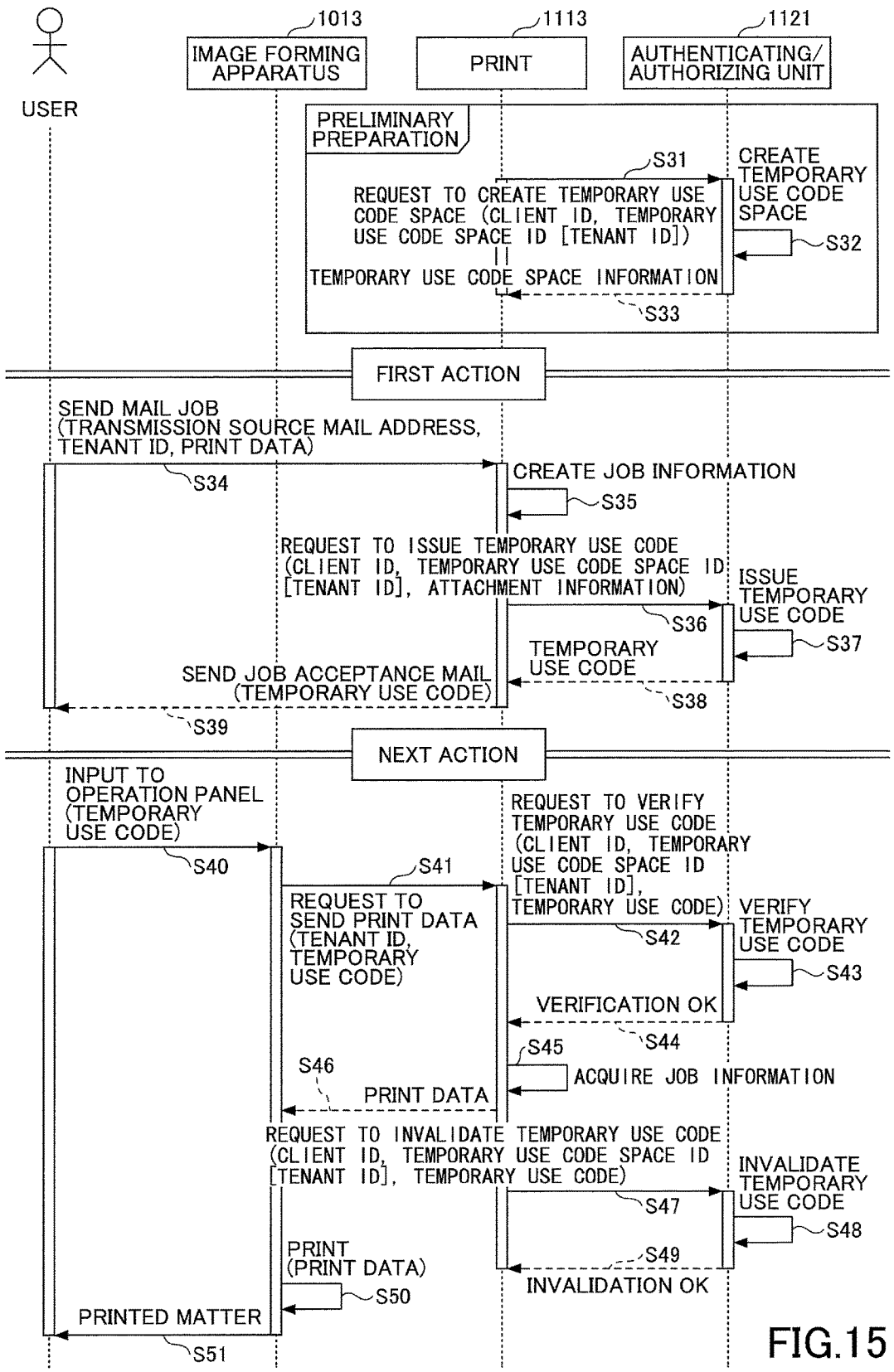
FIG. 15 is a sequence diagram illustrating an example of a process by the service providing system according to a second embodiment of the present invention.

FIG. 15 is a sequence diagram illustrating an example of a process by the service providing system 1014 according to the second embodiment of the present invention. The service providing system 1014 according to the second embodiment creates a temporary use code space, as preliminary preparation. For example, the temporary use code space is created in units of tenants. The temporary use code space may be created in units of scales of tenants. Here, a description is given of an example of creating a temporary use code space in units of tenants.

In step S31, the temporary use code space creation managing unit 11 of the print service application 1113 specifies a client ID and a temporary use code space ID (tenant ID) in a request, and requests the authenticating/authorizing unit 1121 to create a temporary use code space relevant to the specified information. In this way, the service providing system 1014 according to the second embodiment can specify a tenant ID as the temporary use code space ID to create a temporary use code space in units of tenants.

For example, the temporary use code space creation managing unit 11 uses the API for creating a temporary use code space illustrated in FIG. 11 included in the platform API 1106, to make the request to create a temporary use code space.

In step S32, the temporary use code space creating unit 22 of the authenticating/authorizing unit 1121 that has received the request to create a temporary use code space, accepts the request to create a temporary use code space using the API for creating a temporary use code space of FIG. 11, and creates a temporary use code space. The temporary use code space creating unit 22 stores temporary use code space information of the temporary use code space as illustrated in FIG. 8, in the temporary use code space information storage unit 1148. In step S33, the temporary use code space creating unit 22 sends a response to the request to create the temporary use code space.

In step S34, as a first action, for example, the user operates the client terminal 1011, and sends an e-mail to which print data is attached, to the print service application 1113. The e-mail includes a transmission source mail address and a tenant ID. In step S35, the process executing unit 13 of the print service application 1113 creates job information based on the e-mail received in step S34. The process executing unit 13 stores the created job information in, for example, the job information storage unit 1147.

FIG. 16 is a configuration diagram illustrating an example of job information stored in the job information storage unit 1147, according to the second embodiment of the present invention. The job information illustrated in FIG. 16 includes the items of an internal ID, a job ID, a tenant ID, a mail address, a print data path, and a temporary use code.

The internal ID is a primal key in the database 1103, and is used for internal management. The job ID is an ID for identifying a job. The tenant ID is an ID for identifying a tenant. The mail address is the transmission source mail address. The print data path expresses the location where the print data is stored.

Furthermore, as the temporary use code, the issued temporary use code is stored. However, in step S35, the temporary use code is not yet issued. Therefore, in the job information of FIG. 16, the field of the temporary use code is blank.

In step S36, the temporary use code issue requesting unit 12 of the print service application 1113 uses, for example, the API for issuing a temporary use code illustrated in FIG. 12 included in the platform API 1106, to make the request to issue a temporary use code.

In step S37, the temporary use code issuing unit 23 of the authenticating/authorizing unit 1121 that has received the request to issue a temporary use code, accepts the request to issue a temporary use code using the API for issuing a temporary use code of FIG. 12, and issues a temporary use code. In step S38, the temporary use code issuing unit 23 returns the temporary use code to the temporary use code issue requesting unit 12 of the print service application 1113. The process executing unit 13 registers the temporary use code, which is reported from the authenticating/authorizing unit 1121 in step S38, as the temporary use code in the job information as illustrated in FIG. 17. FIG. 17 is a configuration diagram illustrating an example of job information in which the temporary use code is registered, according to the second embodiment of the present invention.

The service providing system 1014 according to the second embodiment is capable of associating the job information created in step S35 with the temporary use code issued in step S37, by the job information of FIG. 17.

In step S39, the temporary use code issue requesting unit 12 reads the transmission source mail address from the mail address in the job information of FIG. 17, and sends the temporary use code by an e-mail (job acceptance mail) addressed to the transmission source mail address. For example, the client terminal 1011 receives the job acceptance mail and displays the temporary use code on the display device 102, etc. Therefore, the user is able to confirm the temporary use code that has been issued by the service providing system 1014.

Figure 18:
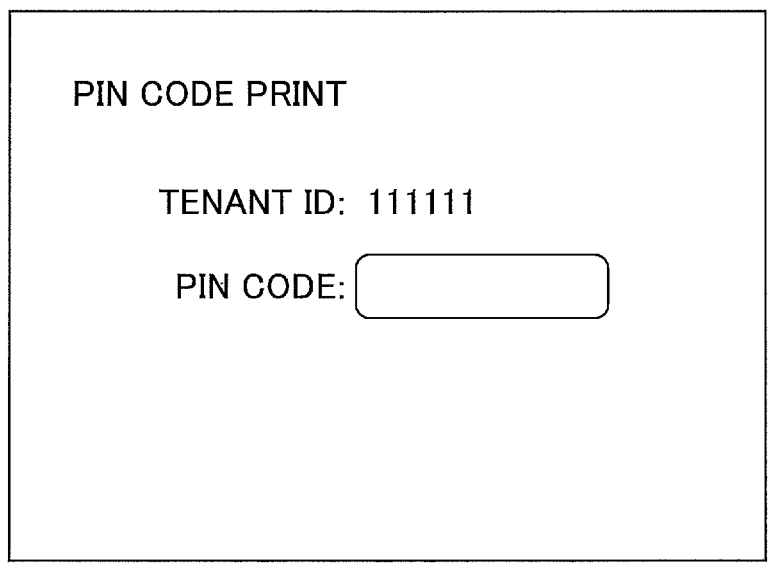
FIG. 18 is an image diagram illustrating a screen for inputting the temporary use code as a PIN code according to the second embodiment of the present invention.

As the next action, in step S40, for example, the user operates the image forming apparatus 1013, and displays a screen as illustrated in FIG. 18 for inputting the temporary use code as a PIN code, on the operation panel 202. The user inputs the temporary use code as a PIN code in the screen of FIG. 18, and requests PIN code printing.

In step S41, the image forming apparatus 1013 specifies a tenant ID set in advance and the temporary use code input in the screen of FIG. 18 in a request, and requests the print service application 1113 of the service providing system 1014 to send print data relevant to the specified information. The process executing unit 13 of the print service application 1113 requests the temporary use code verification requesting unit 14 to verify the specified temporary use code.

In step S42, the temporary use code verification requesting unit 14 specifies the client ID, the temporary use code space ID (tenant ID), and the temporary use code in a request, and requests the temporary use code verifying unit 24 of the authenticating/authorizing unit 1121 to verify the temporary use code relevant to the specified information.

In step S43, the temporary use code verifying unit 24 verifies the temporary use code by referring to, for example, the temporary use code space information of FIG. 8 and the temporary use code information of FIG. 9, based on the request to verify the temporary use code accepted from the print service application 1113.

When the referred information includes a combination of the client ID, the temporary use code space ID, and the temporary use code specified in the request to verify the temporary use code, the temporary use code verifying unit 24 determines that the result of verification is successful. When the referred information does not include a combination of the client ID, the temporary use code space ID, and the temporary use code specified in the request to verify the temporary use code, the temporary use code verifying unit 24 determines that the result of verification is unsuccessful. Here, the description is continued assuming that the verification result is successful (verification OK).

In step S44, the temporary use code verifying unit 24 returns the result indicating verification OK of the temporary use code, to the print service application 1113. The process executing unit 13 obtains the result of verification OK from the temporary use code verification requesting unit 14. In step S45, the process executing unit 13 acquires job information including the temporary use code that has been determined as verification OK, from the job information of FIG. 17.

Then, in step S46, the process executing unit 13 refers to the print data path in the job information acquired in step S45. The process executing unit 13 acquires the print data stored in the location indicated by the print data path, and sends the print data to the image forming apparatus 1013.

In step S47, the process executing unit 13 specifies the client ID, the temporary use code space ID (tenant ID), and the temporary use code in a request, and requests the temporary use code invalidating unit 25 of the authenticating/authorizing unit 1121 to invalidate the temporary use code relevant to the specified information. In step S48, the temporary use code invalidating unit 25 performs a process of invalidating the temporary use code. In step S49, the temporary use code invalidating unit 25 returns a response (invalidation OK) to the print service application 1113.

Then, in step S50, the image forming apparatus 1013 prints the print data received in step S46. In step S51, the user acquires the printed matter printed by the image forming apparatus 1013.

In the sequence diagram of FIG. 15, after confirming that the print data has been sent to the image forming apparatus 1013 in step S46, in step S47, the print service application 1113 requests the authenticating/authorizing unit 1121 to invalidate the temporary use code. Note that in the sequence diagram of FIG. 15, for example, assuming that the print data can be sent to the image forming apparatus 1013, a process of invalidating a "one time" temporary use code may be performed, as in step S17 in the sequence diagram of FIG. 10.

Overview

Second Embodiment

The service providing system 1014 according to the second embodiment is capable of using a temporary use code issued for each temporary use code space to print the print data, which has been stored in association with the temporary use code, from the image forming apparatus 1013.

Third Embodiment

In the second embodiment, as illustrated in FIG. 17, the temporary use code has to be managed in association with the job information. In a third embodiment, a job ID is specified as attachment information that is an option parameter of the API for issuing a temporary use code illustrated in FIG. 12. Accordingly, the temporary use code and the job ID of the job information are managed in association with each other, by the temporary use code information illustrated in FIG. 9.

Figure 19:
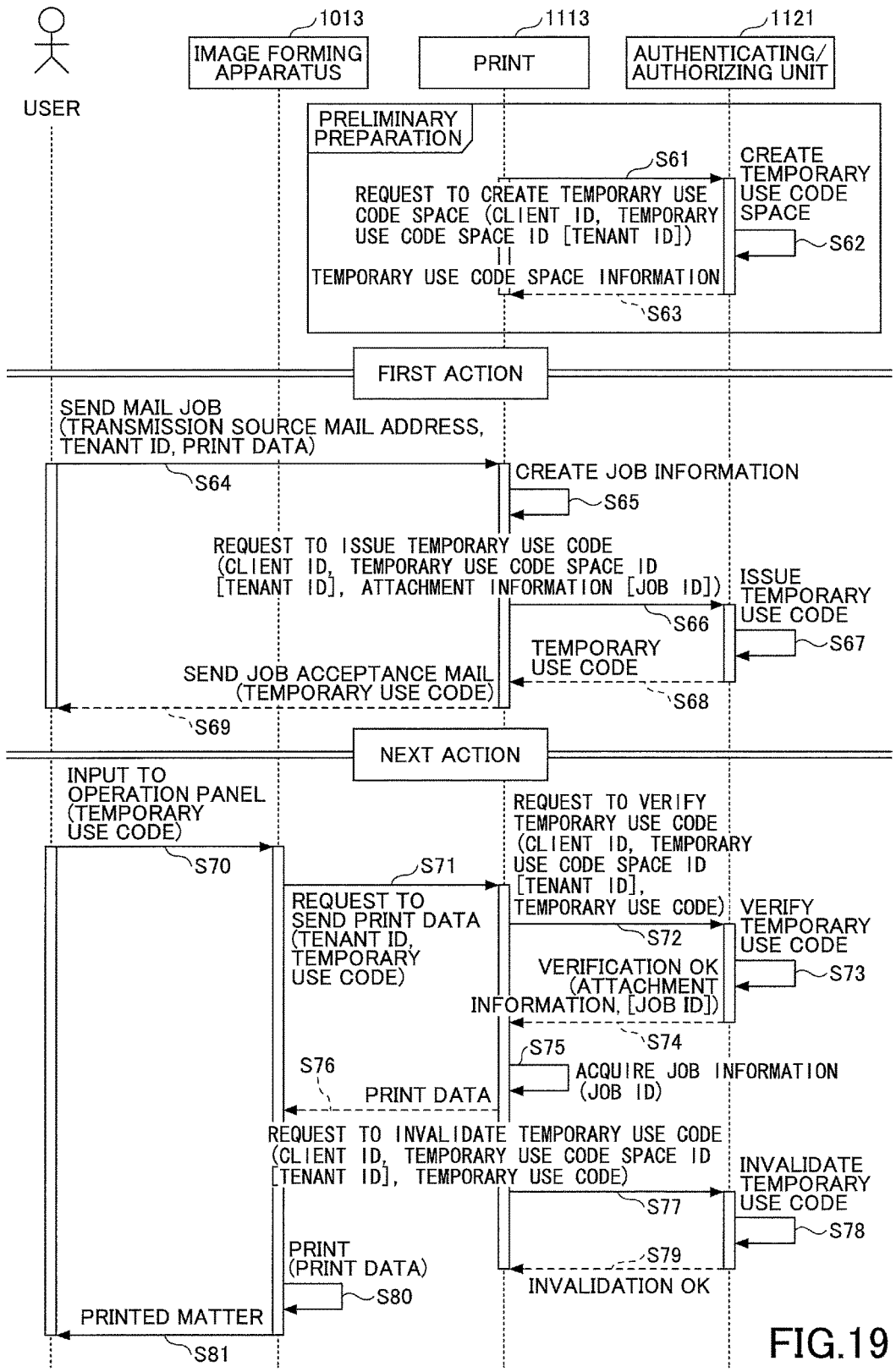
FIG. 19 is a sequence diagram illustrating an example of a process by the service providing system according to a third embodiment of the present invention.

Note that the third embodiment is the same as the second embodiment except for some parts, and therefore descriptions are omitted according to need. FIG. 19 is a sequence diagram illustrating an example of a process by the service providing system 1014 according to the third embodiment of the present invention. The processes of steps S61 through S64 are the same as the processes of steps S31 through S34 of FIG. 15.

In step S65, the process executing unit 13 of the print service application 1113 creates job information of FIG. 20, based on the e-mail received in step S34. The process executing unit 13 stores the created job information in, for example, the job information storage unit 1147.

FIG. 20 is a configuration diagram illustrating another example of job information stored in the job information storage unit 1147 according to the third embodiment of the present invention. In the job information illustrated in FIG. 20, the temporary use code is deleted from the items of the job information of FIG. 16.

In step S66, the temporary use code issue requesting unit 12 of the print service application 1113 uses, for example, the API for issuing a temporary use code illustrated in FIG. 12 included in the platform API 1106, to make the request to issue a temporary use code. In step S66, a job ID is specified as the attachment information in the API for issuing a temporary use code.

In step S67, the temporary use code issuing unit 23 of the authenticating/authorizing unit 1121 that has received the request to issue a temporary use code, accepts the request to issue a temporary use code using the API for issuing a temporary use code space of FIG. 12, and issues a temporary use code. The temporary use code issuing unit 23 stores temporary use code information of the temporary use code as illustrated in FIG. 9, in the temporary use code information storage unit 1149. By the temporary use code information of FIG. 9, the service providing system 1014 according to the third embodiment is capable of managing the temporary use code that has been issued in association with the job ID of the job information. The processes of steps S68 through S72 are the same as the processes of steps S38 through S42 of FIG. 15.

In step S73, the temporary use code verifying unit 24 verifies the temporary use code by referring to, for example, the temporary use code space information of FIG. 8 and the temporary use code information of FIG. 9, based on the request to verify the temporary use code accepted from the print service application 1113.

When the referred information includes a combination of the client ID, the temporary use code space ID, and the temporary use code specified in the request to verify the temporary use code, the temporary use code verifying unit 24 determines that the result of verification is successful. When the referred information does not include a combination of the client ID, the temporary use code space ID, and the temporary use code specified in the request to verify the temporary use code, the temporary use code verifying unit 24 determines that the result of verification is unsuccessful. Here, the description is continued assuming that the verification result is successful (verification OK).

In step S74, the temporary use code verifying unit 24 returns the result indicating verification OK of the temporary use code, together with the job ID specified as the attachment information in the temporary use code information of FIG. 9, to the print service application 1113. The process executing unit 13 obtains the result of verification OK together with the job ID, from the temporary use code verification requesting unit 14.

In step S75, the process executing unit 13 acquires the job information including the job ID, which has been obtained together with the result of verification OK from the job information of FIG. 20. Then, in step S76, the process executing unit 13 refers to the print data path in the job information acquired in step S75. The process executing unit 13 acquires the print data stored in the location indicated by the print data path, and sends the print data to the image forming apparatus 1013. Note that the processes of steps S77 through S81 are the same as the processes of steps S47 through S51 of FIG. 15.

In the sequence diagram of FIG. 19, the job ID specified as attachment information is stored as temporary use code information in the temporary use code information storage unit 1149, and when responding to the request to verify the temporary use code, the job ID is returned to the print service application 1113. Therefore, the print service application 1113 does not have to manage the temporary use code in association with job information as illustrated in FIG. 17.

Note that in the sequence diagram of FIG. 19, by specifying the entire contents in the job information of FIG. 20 as the attachment information of the API for issuing the temporary use code in step S66, there will be no need for the print service application 1113 to manage the job information of FIG. 20.

Overview

Third Embodiment

The service providing system 1014 according to the third embodiment is capable of printing the print data stored in association with the temporary use code from the image forming apparatus 1013, without managing the job information and the temporary use code in association with each other in the print service application 1113.

Fourth Embodiment

In a fourth embodiment, the temporary use code can be used for a plurality of purposes. The fourth embodiment is the same as the first embodiment except for some parts, and therefore descriptions are omitted according to need.

FIG. 21 is a configuration diagram illustrating another example of temporary use code space information stored in the temporary use code space information storage unit 1148. Items of the temporary use code space information illustrated in FIG. 21 are the same as the items of the temporary use code space information illustrated in FIG. 8. However, in the fourth embodiment, only one temporary use code space for the temporary use code associated with the authority described below, is created.

A temporary use code space for the temporary use code associated with the authority is created, for example, when an authentication basis is activated. Furthermore, in the temporary use code space for the temporary use code associated with the authority, "NULL" is stored as the client internal ID.

Furthermore, FIG. 22 is a configuration diagram illustrating an example of a temporary use code information management table stored in the temporary use code information storage unit 1149 according to the fourth embodiment of the present invention. In the temporary use code information of FIG. 22, an authority internal ID is added to the items of the temporary use code information of FIG. 9, to associate the temporary use code with the authority. Nothing is stored in the attachment information. Note that the records in the temporary use code information associated with the authority, all of the values of the temporary use code space internal ID will be the same.

Furthermore, in the fourth embodiment, the application-unique setting information storage unit 1150 unique to the application in the database 1103 stores authority information, authority subject information, authority resource information, authority operation information, authority operation entity information, authority condition information, and authority API resource information.

FIG. 23 is a configuration diagram illustrating an example of an authority information management table storing authority information. The authority information of FIG. 23 includes the items of an internal ID, an authority ID, a name, and an explanation. The internal ID is a primal key in the database 1103, and is used for internal management. The authority ID is an ID for identifying the authority. The name is the name of the authority. The explanation is an explanation of the authority. Note that details of the authority (the subject of the authority, the resource that is the target of the authority, and operations with respect to the resource) are managed in a separate table as described below.

FIG. 24 is a configuration diagram illustrating an example of an authority subject information management table storing authority subject information. The authority subject information of FIG. 24 includes the items of an internal ID, an authority internal ID, the name of a subject table, and an internal ID of the subject. The internal ID is a primal key in the database 1103, and is used for internal management. The authority internal ID is an internal ID for identifying the authority. The name of the subject table is the name of the table storing the entity of the subject of the authority. The internal ID of the subject is the internal ID of the entity of the subject of the authority.

The authority subject information of FIG. 24 is an intermediate table for associating the object that is the subject of the authority to be associated with the temporary use code, with the authority per se. The authority and the entity of the subject have a relationship of one vs. multiple. Furthermore, the entity of the subject of the authority may be specified in a record of any kind of table.

FIG. 25 is a configuration diagram illustrating an example of an authority resource information management table storing authority resource information. The authority resource information of FIG. 25 includes the items of an internal ID, an authority internal ID, the name of an authority resource table, and an internal ID of the authority resource.

The internal ID is a primal key in the database 1103, and is used for internal management. The authority internal ID is an internal ID for identifying the authority. The name of an authority resource table is a name of the table storing the entity of the authority resource. The internal ID of the authority resource is an internal ID of the entity of the authority resource.

The authority resource information of FIG. 25 is an intermediate table for associating the target (authority resource) to be operated according to the authority to be associated with the temporary use code, with the authority per se. The authority and the entity of the authority resource have a relationship of multiple vs. multiple. Furthermore, the entity of the authority resource may be specified in a record of any kind of table.

FIG. 26 is a configuration diagram illustrating an example of an authority operation information management table storing authority operation information. The authority operation information of FIG. 26 includes the items of an internal ID, an authority internal ID, and an internal ID of the entity of the operation.

The internal ID is a primal key in the database 1103, and is used for internal management. The authority internal ID is an internal ID for identifying the authority. The internal ID of the entity of the operation is an internal ID of the entity of the operation of the authority.

The authority operation information of FIG. 26 is an intermediate table for associating information (operation) indicating what kind of operation is allowed to the authority resource by the authority to be associated with the temporary use code, with the authority per se. The authority and the entity of the operation have a relationship of multiple vs. multiple. Unlike the subject and the authority resource, the entity of the operation of the authority is stored in an authority operation entity information management table as illustrated in FIG. 27.

FIG. 27 is a configuration diagram illustrating an example of an authority operation entity information management table storing authority operation entity information. The authority operation entity information of FIG. 27 includes the items of an internal ID, the type, and the name. The internal ID is a primal key in the database 1103, and is used for internal management. The type is the type of operation. The name is the name of the operation. In the authority operation entity information of FIG. 27, when the type of operation is "http_method", HyperText Transfer Protocol (HTTP) methods such as "get, post, delete, and put" are stored as the names. Furthermore, the type of operation may be freely set.

FIG. 28 is a configuration diagram illustrating an example of an authority condition information management table storing authority condition information. The authority condition information of FIG. 28 includes the items of an internal ID, an authority internal ID, and a condition. The internal ID is a primal key in the database 1103, and is used for internal management. The authority internal ID is an internal ID for identifying the authority. Furthermore, the condition is a condition for the authority to become valid. As the condition, a JavaScript Object Notation (JSON) object is stored as a character string. For example, the case of FIG. 28 expresses a condition that the authority becomes valid when the role of the request body is "User".

FIG. 29 is a configuration diagram illustrating an example of an authority API resource information management table storing authority API resource information. The authority API resource information of FIG. 29 includes the items of an internal ID, an authority resource internal ID, and path.

The internal ID is a primal key in the database 1103, and is used for internal management. The authority resource internal ID is an internal ID for identifying the authority resource. The path is the path of the API. The authority API resource information management table is a table used as the entity of the authority resource, when connecting an API such as a Web API as a resource to the authority.

Figure 30:
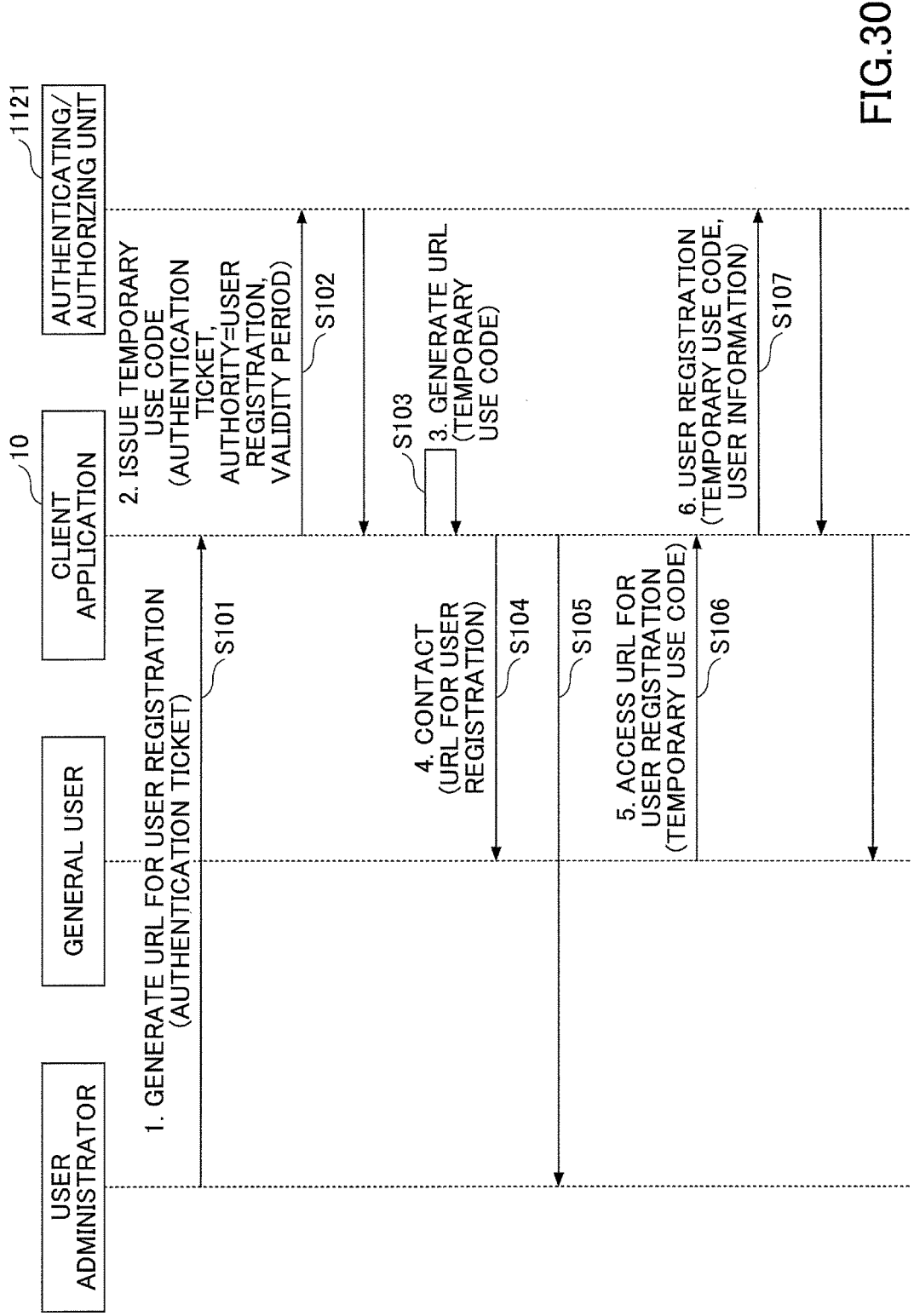
FIG. 30 is a sequence diagram illustrating an example of a process by the service providing system according to the fourth embodiment of the present invention.

FIG. 30 is a sequence diagram illustrating an example of a process by the service providing system 1014 according to the fourth embodiment of the present invention. The sequence diagram of FIG. 30 expresses the processing procedure when temporary use code authentication is used for performing user registration.

In step S101, a user administrator displays a screen for generating a URL for user registration as illustrated in FIG.

31, for example, on the client terminal 1011. FIG. 31 is an image diagram illustrating an example of a screen for generating a URL for user registration. The screen for generating a URL for user registration of FIG. 31 is an example of a case where a mail is used to report a URL for user registration to a general user. Note that in the example of the screen for generating a URL for user registration of FIG. 31, one mail address can be input; however, it may be possible to input a plurality of mail addresses.

The user administrator inputs the mail address of the general user to be newly registered, in the screen for generating a URL for user registration as illustrated in FIG. 31, and presses the send button. The client terminal 1011 operated by the user administrator specifies an authentication ticket in a request, and requests the client application 10 to generate a URL for user registration.

In step S102, the temporary use code issue requesting unit 12 of the client application 10 requests the authenticating/authorizing unit 1121 to issue a temporary use code by which a user can be registered. In the request of step S102, the authentication ticket, an authority for user registration, and a validity period are specified.

When the temporary use code issuing unit 23 of the authenticating/authorizing unit 1121 confirms the validity of the authentication ticket, the temporary use code issuing unit 23 issues a temporary use code by which user registration is possible, and returns the temporary use code to the client application 10. In step S103, the process executing unit 13 of the client application 10 generates a URL for user registration including a temporary use code. Note that when a plurality of mail addresses are input to a screen for generating a URL for user registration, in which a plurality of mail addresses can be input, in step S103, a plurality of temporary use codes are issued.

In step S104, the process executing unit 13 of the client application 10 sends a mail including text as illustrated in FIG. 32, for example, to the client terminal 1011 of a general user. FIG. 32 is an image diagram illustrating an example of text in a mail for reporting a URL for user registration to a general user. In the URL for user registration indicated in FIG. 32, a temporary use code is embedded. Note that in step S105, the client application 10 sends a response to the request to generate a URL for user registration in step S101, to the client terminal 1011.

In step S106, the general user operates the client terminal 1011 to open the URL for user registration in FIG. 32. The client terminal 1011 of the general user accesses the URL for user registration in which the temporary use code is embedded, to request the client application 10 to register the user.

In step S107, the process executing unit 13 of the client application 10 uses the temporary use code embedded in the accessed URL for user registration, to register the user in the authenticating/authorizing unit 1121.

The request of the API executed in step S102 and the response to the request are, for example, as illustrated in FIGS. 33A and 33B. FIGS. 33A and 333 are diagrams illustrating examples of the request of the API executed in step S102 and the response to the request.

FIG. 33A is a diagram illustrating a request of the API executed in step S102. Furthermore, FIG. 333 is a diagram illustrating a response to the request of the API executed in step S102. The meanings of the parameters in the request of the API and the response are as follows.

resource: The resource that can be used according to the issued temporary use code.
action: The operation that can be executed with respect to the resource, according to the issued temporary use code.
condition: The condition that is additionally verified when executing the operation specified by action with respect to the resource specified in resource, according to the issued temporary use code.
expires_in: The validity period of the temporary use code.
onetime: Information indicating whether the temporary use code can only be used once.
code: The issued temporary use code.

The request of the API of FIG. 33A is for making a request to "issue a temporary use code by which a request of the API can be executed, such that the role attribute of the request body is User with respect to the URL of /organizations/aaa/users of the authenticating/authorizing unit 1121, and the HTTP method is POST".

The request of the API executed in step S107 is, for example, as illustrated in FIG. 34. FIG. 34 is a diagram illustrating an example of a request of the API executed in step S107.

The request of the API illustrated in FIG. 34 uses the temporary use code issued according to the request of the API executed in step S102 and user information (a user ID, a password, and a role).

Figure 35:
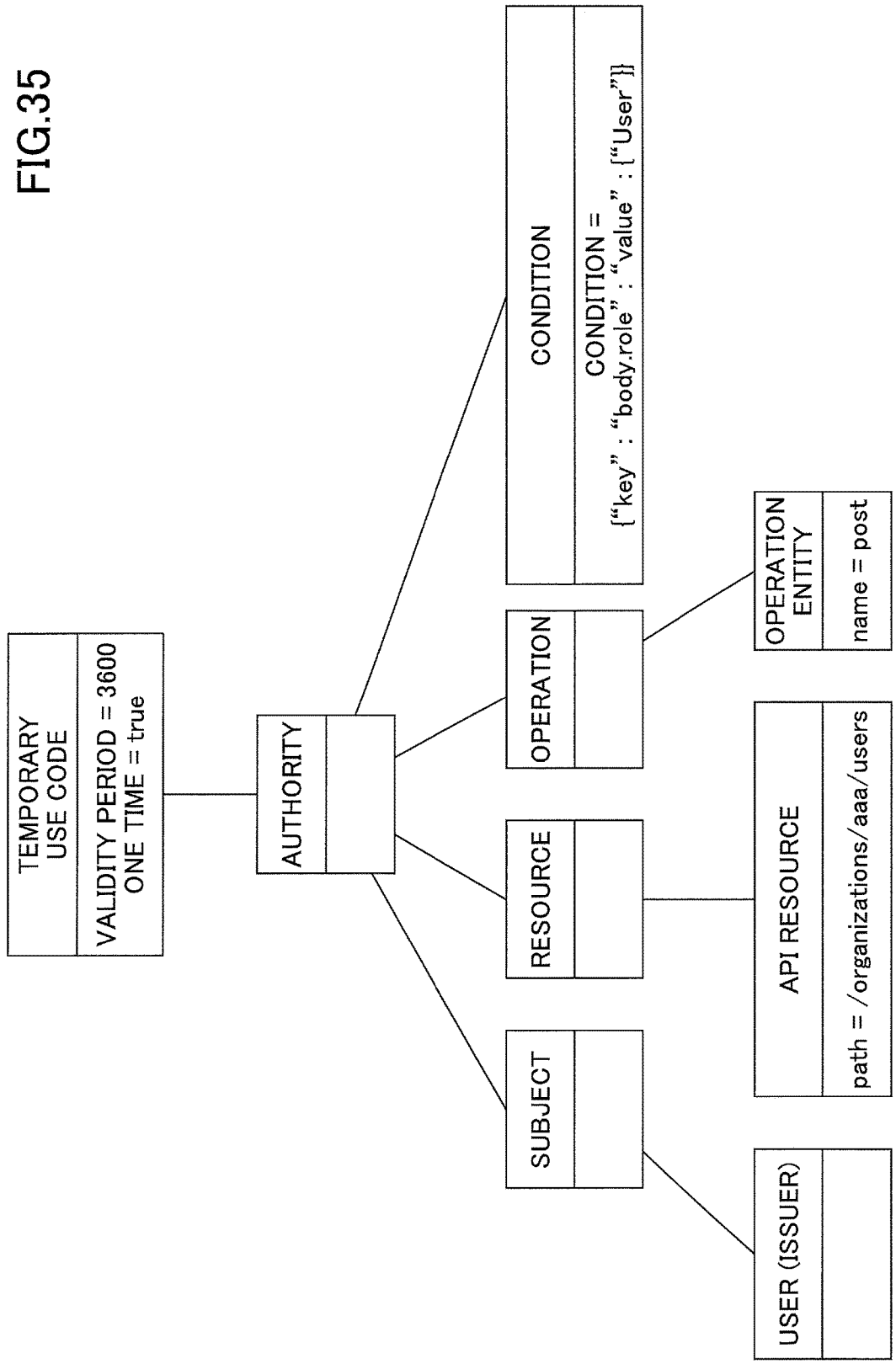
FIG. 35 is a diagram illustrating an example of associations between the tables.

Furthermore, when the API of FIG. 33A is executed in step S102, the associations between the tables illustrated in FIGS. 21 through 29 become as illustrated in FIG. 35. FIG. 35 is a diagram illustrating an example of associations between the tables.

As illustrated in FIG. 35, the temporary use code information management table of FIG. 22 is associated with the authority information management table of FIG. 23. The authority information management table of FIG. 23 is associated with the authority subject information management table of FIG. 24, the authority resource information management table of FIG. 25, the authority operation information management table of FIG. 26, and the authority condition information management table of FIG. 28. The authority operation information management table of FIG. 26 is associated with the authority operation entity information management table of FIG. 27.

Overview

Fourth Embodiment

In the service providing system 1014 according to the fourth embodiment, by performing the process illustrated in the sequence diagram of FIG. 30, the user administrator delegates the process of creating the account of the general user, to the general user. By the service providing system 1014 according to the fourth embodiment, the temporary use code can be used for a plurality of purposes. Furthermore, even when the temporary use code is used for a plurality of purposes, the load of managing the temporary use code by the client application 10 is not increased.

According to one embodiment of the present invention, easily usable use identification information can be used.

The service providing system, the service providing method, and the information processing apparatus are not limited to the specific embodiments described in the detailed description, and variations and modifications may be made without departing from the spirit and scope of the present invention. The temporary use code is an example of use identification information. The temporary use code space ID is an example of group identification information.

The client application 10 is an example of an application. The temporary use code space creating unit 22 is an example of a group identification information creator. The temporary use code issuing unit 23 is an example of a use identification information issuer. The temporary use code verifying unit 24 is an example of a use identification information verifier. The temporary use code verification requesting unit 14 is an example of a use identification information verification requester. The process executing unit 13 is an example of a process executor.

What is claimed is:

1. A service providing system including at least one information processing apparatus for implementing various functions of the service providing system, the service providing system comprising:
    an application configured to provide a service to at least one terminal device that has made a service request including a specification of use identification information;
    a group identification information creator configured to create group identification information for identifying a group of the use identification information, based on a creation request from the application;
    a use identification information issuer configured to issue the use identification information associated with the group identification information, based on an issue request to issue the use identification information from the application, the issue request including a specification of the group identification information; and
    a use identification information verifier configured to verify the use identification information, based on a verification request to verify the use identification information from the application, the verification request including specifications of the group identification information and the use identification information, wherein
    the application includes:
        a use identification information verification requester configured to send the verification request to verify the use identification information specified in the service request, to the use identification information verifier; and
        a process executor configured to execute a process in response to the service request, when a verification result of the use identification information obtained by the use identification information verifier is successful,
    wherein the application sends, to the use identification information issuer, the issue request to issue the use identification information, in response to receiving a job from the at least one terminal device, and
    the process executor sends the print data, which is associated with the job, to an image forming apparatus, and causes the image forming apparatus to perform the job, when the verification result of the use identification information obtained by the use identification information verifier is successful.

2. The service providing system according to claim 1, wherein the group identification information creator creates the group identification information for identifying the group of the use identification information, and also sets at least one attribute of the use identification information to be issued, based on the creation request from the application.

3. The service providing system according to claim 2, wherein the use identification information issuer issues, in association with the group identification information, the use identification information according to the at least one attribute of the use identification information set in association with the group identification information, based on the issue request to issue the use identification information specifying the group identification information from the application.

4. The service providing system according to claim 1, wherein
    the use identification information issuer issues the use identification information associated with the group identification information, and also stores attachment information in association with the group identification information and the use identification information in a storage, based on the issue request to issue the use identification information from the application, the issue request including specifications of the group identification information and the attachment information, and
    the use identification information verifier returns the attachment information, which is stored in association with the group identification information and the use identification information in the storage, to the application, when the verification result of the use identification information is successful.

5. The service providing system according to claim 4, wherein the attachment information includes identification information of job information relating to the process executed by the process executor.

6. The service providing system according to claim 1, wherein
    the use identification information issuer issues the use identification information associated with the group identification information, and also stores authority identification information in association with the group identification information and the use identification information in a storage, based on the issue request to issue the use identification information from the application, the issue request including specifications of the group identification information and the authority identification information, and
    the use identification information verifier causes the application to execute a process of an authority identified by the authority identification information, based on the authority identification information that is stored in association with the group identification information and the use identification information in the storage, when the verification result of the use identification information is successful.

7. The service providing system according to claim 6, wherein the application accepts an access to an access destination for executing the process of the authority from the at least one terminal device, the access destination having embedded the use identification information, and when the verification result of the use identification information obtained by the use identification information verifier is successful, the application executes the process of the authority identified by the authority identification information, based on the authority identification information that is stored in association with the use identification information in the storage.

8. The service providing system according to claim 1, wherein
    the application sends, to the use identification information issuer, the issue request to issue the use identification information, in response to receiving a job including print data by a mail from the at least one terminal device,
    the use identification information issuer issues the use identification information based on the issue request, the application acquires the issued use identification information and sends the acquired use identification information to the at least one terminal device by a mail, the use identification information verification requester sends the verification request to verify the use identification information specified in a print data request to the use identification information verifier, when the application receives the print data request specifying the use identification information from an image forming apparatus, and the process executor sends the print data, which is associated with the job, to the image forming apparatus, and causes the image forming apparatus to print the print data, when the verification result of the use identification information obtained by the use identification information verifier is successful.

9. A service providing method executed by a service providing system including at least one information processing apparatus for implementing various functions of the service providing system, the service providing method comprising:

creating group identification information for identifying a group of use identification information, based on a creation request from an application for providing a service to at least one terminal device that has made a service request including a specification of the use identification information;

issuing the use identification information associated with the group identification information, based on an issue request to issue the use identification information from the application, the issue request including a specification of the group identification information;

requesting, by the application, to verify the use identification information specified in the service request;

verifying the use identification information, based on the verification request to verify the use identification information from the application, the verification request including specifications of the group identification information and the use identification information; and executing, by the application, a process in response to the service request, when a verification result of the use identification information is successful, wherein the method further comprises:

sending, by the application, the issue request to issue the use identification information to the service providing system, in response to receiving a job from the at least one terminal device, and sending, by the application, the print data, which is associated with the job, to an image forming apparatus, and causing the image forming apparatus to perform the job, when the verification result of the use identification information obtained by the use identification information verifier is successful.

10. An information processing apparatus comprising:

an application configured to provide a service to at least one terminal device that has made a service request including a specification of use identification information;

a group identification information creator configured to create group identification information for identifying a group of the use identification information, based on a creation request from the application;

a use identification information issuer configured to issue the use identification information associated with the group identification information, based on an issue request to issue the use identification information from the application, the issue request including a specification of the group identification information; and a use identification information verifier configured to verify the use identification information, based on a verification request to verify the use identification information from the application, the verification request including specifications of the group identification information and the use identification information, wherein the application includes:

a use identification information verification requester configured to send the verification request to verify the use identification information specified in the service request, to the use identification information verifier; and a process executor configured to execute a process in response to the service request, when a verification result of the use identification information obtained by the use identification information verifier is successful, wherein the application sends, to the use identification information issuer, the issue request to issue the use identification information, in response to receiving a job from the at least one terminal device, and the process executor sends the print data, which is associated with the job, to an image forming apparatus, and causes the image forming apparatus to perform the job, when the verification result of the use identification information obtained by the use identification information verifier is successful.

* * * * *